United States Patent [19]

(12) United States Patent
Haggblade et al.

(10) Patent No.: US 12,055,935 B2
(45) Date of Patent: Aug. 6, 2024

(54) PERPENDICULAR CUT-IN TRAINING

(71) Applicant: Zoox, Inc., Foster City, CA (US)

(72) Inventors: Michael Haggblade, El Dorado Hills, CA (US); Benjamin Isaac Mattinson, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/860,386

(22) Filed: Jul. 8, 2022

(65) Prior Publication Data

US 2023/0028035 A1 Jan. 26, 2023

Related U.S. Application Data

(63) Continuation of application No. 16/803,644, filed on Feb. 27, 2020, now Pat. No. 11,385,642.

(51) Int. Cl.
*G05D 1/00* (2024.01)
*B60W 50/00* (2006.01)
(Continued)

(52) U.S. Cl.
CPC ........... *G05D 1/0088* (2013.01); *B60W 50/00* (2013.01); *G06N 3/08* (2013.01); *G07C 5/04* (2013.01); *B60W 2050/0075* (2013.01); *B60W 2050/0083* (2013.01); *B60W 2510/06* (2013.01); *B60W 2510/30* (2013.01); *B60W 2520/10* (2013.01);
(Continued)

(58) Field of Classification Search
CPC ............................. G05D 1/0088; B60W 50/00; B60W 2556/10; B60W 2554/4044; B60W 2554/4045; B60W 2050/0075; B60W 2050/0083; B60W 2510/06; B60W 2510/30; B60W 2520/10; G06N 3/08; G07C 5/04
See application file for complete search history.

(56) References Cited

U.S. PATENT DOCUMENTS 9,008,890 B1 4/2015 Herbach et al.
9,120,485 B1 9/2015 Dolgov
(Continued)

FOREIGN PATENT DOCUMENTS

DE 102018005261 A1 1/2020

OTHER PUBLICATIONS

A. Jain, "Discrete Residual Flow for Probabilistic Pedestrian Behavior Prediction", 2019 (Year: 2019).*
(Continued)

*Primary Examiner* — Russell Frejd
*Assistant Examiner* — Brittany Renee Peko
(74) *Attorney, Agent, or Firm* — Lee & Hayes, P.C.

(57) ABSTRACT

Techniques relating to training a model for detecting that a vehicle is likely to perform a cut-in maneuver are described. Computing device(s) can receive log data associated with vehicles in an environment and can detect an event in the log data, wherein an event corresponds to a cut-in maneuver performed by a vehicle. In an example, the computing device(s) can generate training data based at least in part on converting a portion of the log data that corresponds to the event into a top-down representation of the environment and inputting the training data into a model, wherein the model is trained to output an indication of whether another vehicle is likely to perform another cut-in maneuver.

20 Claims, 8 Drawing Sheets

(51) Int. Cl.
*G06N 3/08* (2023.01)
*G07C 5/04* (2006.01)
(52) U.S. Cl.
CPC ............... *B60W 2554/4044* (2020.02); *B60W 2554/4045* (2020.02); *B60W 2556/10* (2020.02)

(56) References Cited

U.S. PATENT DOCUMENTS

| | | | |
|---|---|---|---|
| 9,612,123 | B1 | 4/2017 | Levinson et al. |
| 10,353,390 | B2 | 7/2019 | Linscott et al. |
| 10,386,856 | B2 | 8/2019 | Wood et al. |
| 10,421,453 | B1 | 9/2019 | Ferguson et al. |
| 10,496,091 | B1* | 12/2019 | Ross ................. G05D 1/0088 |
| 11,221,621 | B2 | 1/2022 | Wengreen et al. |
| 11,370,416 | B2* | 6/2022 | Noguchi ............ B60W 30/06 |
| 2005/0073438 | A1 | 4/2005 | Rodgers et al. |
| 2008/0312832 | A1 | 12/2008 | Greene et al. |
| 2013/0223686 | A1 | 8/2013 | Shimizu et al. |
| 2014/0142839 | A1 | 5/2014 | Kaminade |
| 2016/0280265 | A1 | 9/2016 | Hass et al. |
| 2016/0280266 | A1 | 9/2016 | Kawamata |
| 2017/0369057 | A1 | 12/2017 | Gurghian et al. |
| 2018/0093676 | A1 | 4/2018 | Emura et al. |
| 2018/0366001 | A1 | 12/2018 | Matsunaga |
| 2019/0147255 | A1 | 5/2019 | Homayounfar et al. |
| 2019/0152490 | A1 | 5/2019 | Lan et al. |
| 2019/0283740 | A1 | 9/2019 | Toda |
| 2019/0291727 | A1 | 9/2019 | Shalev-Shwartz et al. |
| 2019/0367022 | A1* | 12/2019 | Zhao ................. B60W 30/0956 |
| 2019/0369637 | A1 | 12/2019 | Shalev-Shwartz et al. |
| 2019/0382007 | A1 | 12/2019 | Casas |
| 2020/0110416 | A1 | 4/2020 | Hong et al. |
| 2020/0172089 | A1* | 6/2020 | Dyer ................... B60W 30/06 |
| 2020/0202540 | A1 | 6/2020 | Wang et al. |
| 2020/0229206 | A1 | 7/2020 | Badic et al. |
| 2020/0265247 | A1 | 8/2020 | Musk et al. |
| 2021/0094577 | A1 | 1/2021 | Shalev-Shwartz et al. |
| 2021/0033404 | A1 | 2/2021 | Lawlor et al. |
| 2021/0056713 | A1 | 2/2021 | Rangesh et al. |
| 2021/0064890 | A1 | 3/2021 | Murveit et al. |
| 2021/0129862 | A1* | 5/2021 | Kim ................. B60W 60/001 |
| 2021/0166340 | A1 | 6/2021 | Nikola et al. |
| 2021/0191394 | A1 | 6/2021 | Dudley et al. |
| 2021/0197813 | A1 | 7/2021 | Houston et al. |
| 2021/0199446 | A1 | 7/2021 | Marschner et al. |
| 2021/0221367 | A1* | 7/2021 | Hiramatsu ............ B60W 30/09 |
| 2021/0269065 | A1 | 9/2021 | Haggblade et al. |
| 2021/0271241 | A1 | 9/2021 | Haggblade et al. |
| 2021/0271254 | A1 | 9/2021 | Chen et al. |

OTHER PUBLICATIONS

C. Liu, "The Robustly-Safe Automated Driving System for Enhanced Active Safety", 2017 (Year: 2017).*

U.S. Appl. No. 16/420,050, filed May 22, 2019, Hong, et al., "Trajectory Prediction On Top-Down Scenes and Associated Model", 60 pages.

U.S. Appl. No. 16/504,147, filed on Jul. 5, 2019, Garimella, et al., "Prediction On Top-Down Scenes Based On Action Data", 51 pages.

U.S. Appl. No. 16/709,263, filed Dec. 10, 2019, Thalman, et al., "Determining Bias of Vehicle Axles", 39 pages.

Office Action for U.S. Appl. No. 16/803,705, mailed on Sep. 28, 2021, Haggblade, "Perpendicular Cut-In Detection", 27 Pages.

Office Action dated Feb. 2, 2022 for U.S. Appl. No. 16/803,705, Haggblade, "Perpendicular Cut-In Detection", 36 pages.

Office Action for U.S. Appl. No. 16/803,705, mailed Jun. 22, 2022, Haggblade , "Perpendicular Cut-In Detection", 52 pages.

Office Action for U.S. Appl. No. 16/803,644, mailed on Sep. 10, 2021, Haggblade, "Perpendicular Cut-In Training", 16 pages.

International Preliminary Report on Patentability mailed Sep. 9, 2022 for PCT Application No. PCT/US21/18341, 7 pages.

Extended European Search Report mailed Feb. 21, 2024 for European Application No. 21759759.0, a foreign counterpart to U.S. Pat. No. 11,385,642, 8 pages.

* cited by examiner

PERPENDICULAR CUT-IN TRAINING

CROSS REFERENCE TO RELATED APPLICATIONS

This is a continuation application which claims priority to commonly assigned, co-pending U.S. patent application Ser. No. 16/803,644, filed Feb. 27, 2020. Application Ser. No. 16/803,644 is fully incorporated herein by reference.

BACKGROUND

In general, prediction systems utilize information associated with objects in an environment to infer future actions of the objects, such as trajectories. Such information can then be used to determine how to control a vehicle, for example, in the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
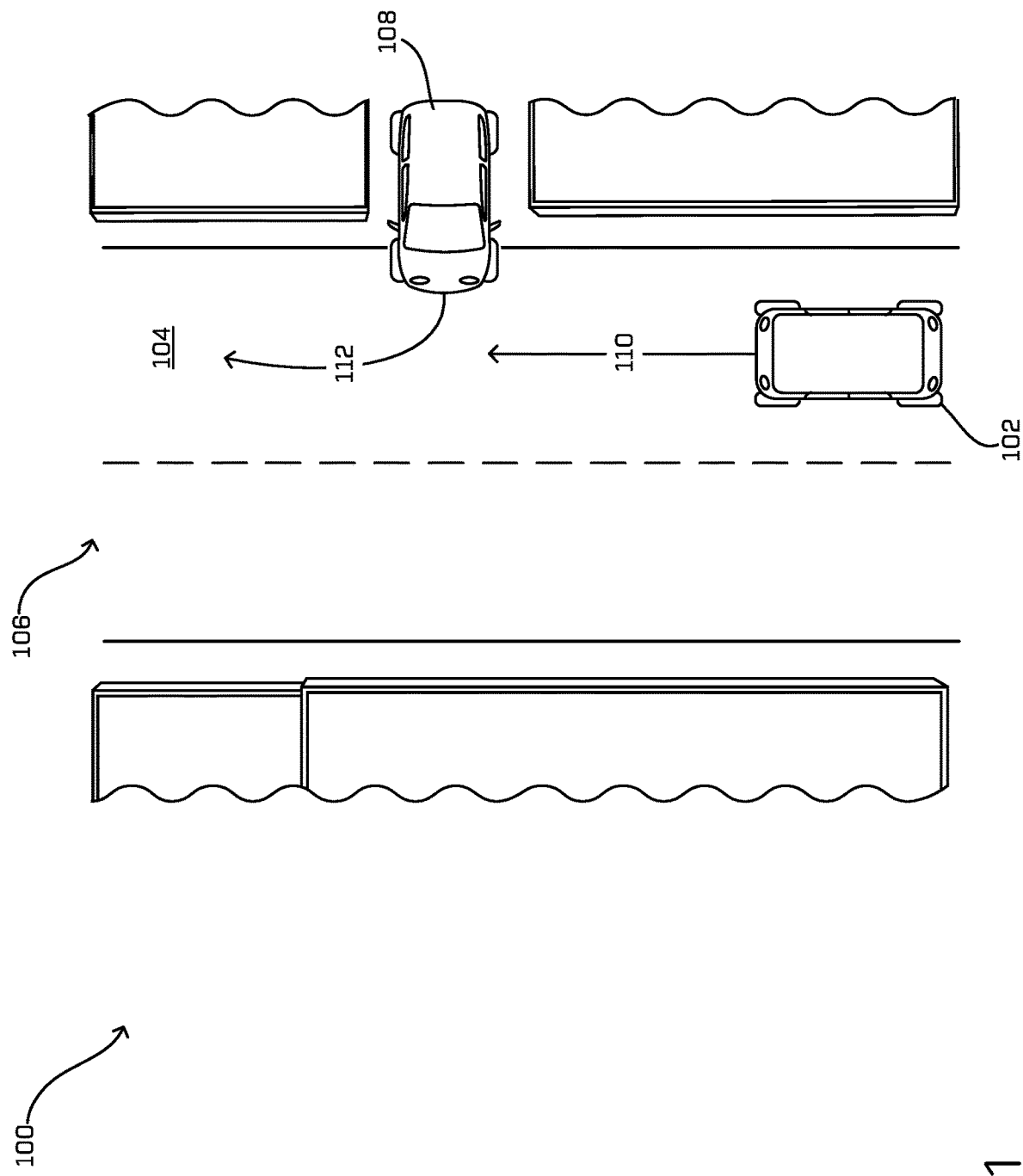
FIG. 1 illustrates an example environment for predicting whether a vehicle is going to enter a lane region in front of another vehicle, as described herein.

Techniques described herein are directed to training and using a model to predict particular behaviors of objects (e.g., pedestrians, animals, cyclists, other vehicles, etc.) in an environment of a vehicle. For instance, a model can be trained using machine learning to predict when a vehicle that is proximate and substantially perpendicular to another vehicle, such as an autonomous vehicle, is going to enter a lane region in front of the autonomous vehicle (e.g., "cut-in"), such as by pulling out of a driveway, pulling out of a perpendicular parking spot, making a U-turn, or the like. In at least one example, the model can be trained based on training data previously collected by one or more vehicles in an environment. In at least one example, the model can be provided to an autonomous vehicle, and can be utilized by computing device(s) onboard the autonomous vehicle to predict how objects (e.g., other vehicles) proximate and substantially perpendicular to the autonomous vehicle are likely to behave.

For example, computing device(s) onboard the autonomous vehicle can leverage the model to predict when a vehicle that is proximate and substantially perpendicular to the autonomous vehicle is going to enter a lane region in front of the autonomous vehicle (e.g., "cut-in"), such as by pulling out of a driveway, pulling out of a perpendicular parking spot, making a U-turn, or the like. These scenarios, in particular, present a unique challenge in that such agents (other vehicles performing these maneuvers) may begin from an unstructured portion of a map (e.g., in which there are no lane markers, such as in driveways or parking lots) in addition to the fact that agent motion may comprise transitions to structured motions and/or complex motions from multi-point turns which may not obey the rules of the road. The computing device(s) onboard the autonomous vehicle can utilize such predictions to determine how to navigate the autonomous vehicle in the environment. That is, the computing device(s) onboard the autonomous vehicle can adapt driving operations based on predictions output by the model. As such, the autonomous vehicle can utilize the model to (i) predict when a vehicle proximate and substantially perpendicular to the autonomous vehicle is going to cut-in and (ii) determine a trajectory to navigate the autonomous vehicle to accommodate the other vehicle (e.g., cause the autonomous vehicle to decelerate thereby increasing a follow distance between the vehicle and another vehicle, cause the autonomous vehicle to yield to the other vehicle and/or stop, cause the autonomous vehicle to perform a lane change operation, cause the autonomous vehicle to safely maneuver around another vehicle, and/or cause the autonomous vehicle to perform any other combination of maneuvers the autonomous vehicle is capable of performing).

Techniques described herein are directed to training a model, for example, using machine learning, to enable a vehicle, such as an autonomous vehicle, to predict the behavior of objects in its environment. Techniques described herein can utilize noisy sensor data, and more particularly, noisy prediction data (e.g., processed sensor data) to predict the behavior of objects in an environment associated with a vehicle more accurately than with existing prediction techniques. Furthermore, and as described above, with respect to vehicles that are perpendicular, or substantially perpendicular, to an autonomous vehicle, such vehicles may not be following a road network and/or following the rules of the road for which the autonomous vehicle is trained to perceive and understand. As such, existing prediction techniques may be insufficient for detecting and safely maneuvering around such vehicles. That is, techniques described herein provide a technological improvement over existing prediction technology. In addition to improving the accuracy with which sensor data can be used to predict behaviors of objects in an environment of a vehicle, techniques described herein can reduce false positives and improve safety outcomes.

The techniques described herein can be implemented in a number of ways. Example implementations are provided below with reference to the following figures. Example implementations are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles in which such a component may provide an indication to a driver of the vehicle of whether it is safe to perform various maneuvers. In another example, the techniques can be utilized in an aviation or nautical context, or in any component involving objects or entities that may be associated with behavior that is unknown to the component. In some examples, the techniques can be utilized in contexts outside of autonomous vehicles and/or perception components. Furthermore, the techniques described herein can be used with real data (e.g., captured using sensor(s)), simulated data (e.g., generated by a simulator), or any combination of the two.

FIG. 1 illustrates an example environment 100 for predicting whether a vehicle is going to enter a lane region in front of another vehicle, as described herein.

In the example environment 100, a vehicle 102 can be positioned in a driving lane 104 of a driving surface 106. In at least one example, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the components and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 102 is an autonomous vehicle; however, the vehicle 102 could be any other type of vehicle.

In at least one example, the driving lane 104 can be associated with a lane region and the driving surface 106 can be associated with a road. In at least one example, another vehicle 108 can be detected within the environment 100. In some examples, the other vehicle 108 can be proximate to the vehicle 102 such that the other vehicle 108 is within a threshold distance of the vehicle 102. In some examples, the other vehicle 108 can be associated with a direction of travel that is different from the vehicle 102. The direction of travel of the vehicle 102 is illustrated by the arrow at the end of the trajectory 110 along which the vehicle 102 is travelling. In some examples, the other vehicle 108 can be associated with a direction of travel that is opposite the direction of travel of the vehicle 102. In other examples, a direction of travel can be different from another direction of travel by being offset from the other direction of travel by more than a threshold.

In some examples, the other vehicle 108 can be positioned at an angle to the vehicle 102. In at least one example, the angle can be within a designated offset of 90 degrees such that the other vehicle 108 is substantially perpendicular to the vehicle 102. That is, for the purpose of this discussion, a vehicle is "substantially perpendicular" to another vehicle if an angle between the two vehicles is within a designated offset of 90 degrees. As a non-limiting example, the designated offset can be 50 degrees such that the vehicle 102 and the other vehicle 108 (or any two vehicles) can be "substantially perpendicular" so long as the angle between the two is between 40 degrees and 140 degrees. In at least one example, the designated offset can be learned using machine learning techniques described herein. In some examples, the designated offset can be set manually, can be based on map data (e.g., may be dependent on location), and the like.

In FIG. 1, the other vehicle 108 is positioned substantially perpendicular to the vehicle 102. As a non-limiting example, the other vehicle 108 can be pulling out of a parking spot (e.g., a substantially perpendicular parking spot) or parking lot, an alley, a driveway, or any other location that is substantially perpendicular to the vehicle 102. In some examples, such a parking spot or parking lot, alley, driveway, etc. can be annotated in a map associated with the environment 100. In other examples, such a parking spot or parking lot, alley, driveway, etc. may not be annotated in the map.

In at least one example, the vehicle 102 can include one or more computing devices, which can be onboard the vehicle 102. In at least one example, the computing device(s) can include components for controlling the vehicle 102. For instance, in at least one example, a perception component can perform object detection, segmentation, and/or classification based at least in part on sensor data received from sensor component(s) of the vehicle 102. In at least one example, a prediction component can receive sensor data from the sensor component(s), map data associated with a map (e.g., of the environment 100), and/or perception data output from the perception component (e.g., processed sensor data), and can output predictions associated with one or more objects within the environment 100 of the vehicle 102. In at least one example, a planning component can determine outputs to use to control the vehicle 102 based at least in part on sensor data received from the sensor component(s), map data, and/or any determinations made by the other components of the vehicle 102. Additional details associated with such computing device(s) and associated components are described below with reference to FIG. 6.

As described above, the vehicle 102 can be associated with one or more sensor components. In at least one example, the sensor component(s) can include lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), time of flight (ToF) sensors, etc. Such sensor data can include, but is not limited to, lidar data, radar data, ultrasonic transducer data, sonar data, location data (e.g., global positioning component (GPS), compass, etc.), inertial data (e.g., inertial measurement units data, accelerometer data, magnetometer data, gyroscope data, etc.), camera data (e.g., RGB data, IR data, intensity data, depth data, etc.), wheel encoder data, microphone data, environment sensor data (e.g., temperature sensor data, humidity sensor data, light sensor data, pressure sensor data, etc.), ToF sensor data, etc.

In at least one example, the perception component can detect the other vehicle 108 and the prediction component can predict whether the other vehicle 108 is going to enter the lane region of the driving lane 104 in front of the vehicle 102. In some examples, the prediction component can leverage a model, trained by machine learning mechanism(s), to output a prediction indicating whether the other vehicle 108 is going to enter the lane region of the driving lane 104 in front of the vehicle 102. In at least one example, the prediction component can analyze feature(s) (also referred to as attributes, characteristics, parameters, data, and the like) associated with the environment 100 to determine whether the other vehicle 108 is likely to enter the lane region of the driving lane 104. Such feature(s), which can be associated with characteristic(s) of the environment 100, can include annotations in a map associated with the environment 100 indicating that the other vehicle 108 is located in a parking spot (e.g., a substantially perpendicular parking spot) or parking lot, an alley, a driveway, etc.

In at least one example, the prediction component can analyze feature(s) associated with the other vehicle 108 to determine whether the other vehicle 108 is likely to enter the lane region of the driving lane 104. For example, such feature(s), which can be associated with characteristic(s) of the other vehicle 108, can include, but are not limited to, a position of the other vehicle 108 relative to the vehicle 102 (e.g., direction of travel, angular offset, etc.), an instantaneous velocity of the other vehicle 108, an indication of whether a driver is in the other vehicle 108, an indication of a direction the driver is looking (e.g., head position of the driver), an indication of whether a door associated with the other vehicle 108 is open or closed, an indication of whether an engine of the other vehicle 108 is in a running state or off state, a wheel angle associated with wheel(s) of the other vehicle 108 (additional details for determining such are described in U.S. patent application Ser. No. 16/709,263, which was filed on Dec. 10, 2019, and is incorporated by reference herein in its entirety), an indication of whether a brake light of the other vehicle 108 is illuminated, an indication of whether a headlight of the other vehicle 108 is illuminated, an indication of whether a reverse light of the other vehicle 108 is illuminated, an indication of whether a blinker of the other vehicle 108 is illuminated, or a lighting state associated with the other vehicle 108.

Additional details associated with such a model, and techniques for training such a model, are described below with reference to FIG. 7.

As illustrated in FIG. 1, if the other vehicle 108 follows the trajectory 112 associated therewith, the other vehicle 108 will enter the lane region of the driving lane 104 in front of the vehicle 102 (e.g., as it performs a right turn into traffic). That is, if the other vehicle 108 follows the trajectory 112 associated therewith, the other vehicle 108 will perform a cut-in, such that the planning component associated with the vehicle 102 may modify its trajectory 110 to maneuver the vehicle 102 in view of the other vehicle 202. As described above, the planning component can cause the vehicle 102 to decelerate such to increase a follow distance between the vehicle 102 and the other vehicle 108, cause the vehicle 102 to decelerate and yield to the other vehicle 108 and/or stop, cause the vehicle 102 to perform a lane change, cause the vehicle 102 to safely maneuver around the other vehicle 108, and/or cause the vehicle 102 to perform any other combination of maneuvers that the vehicle 102 is capable of performing.

Figure 2:
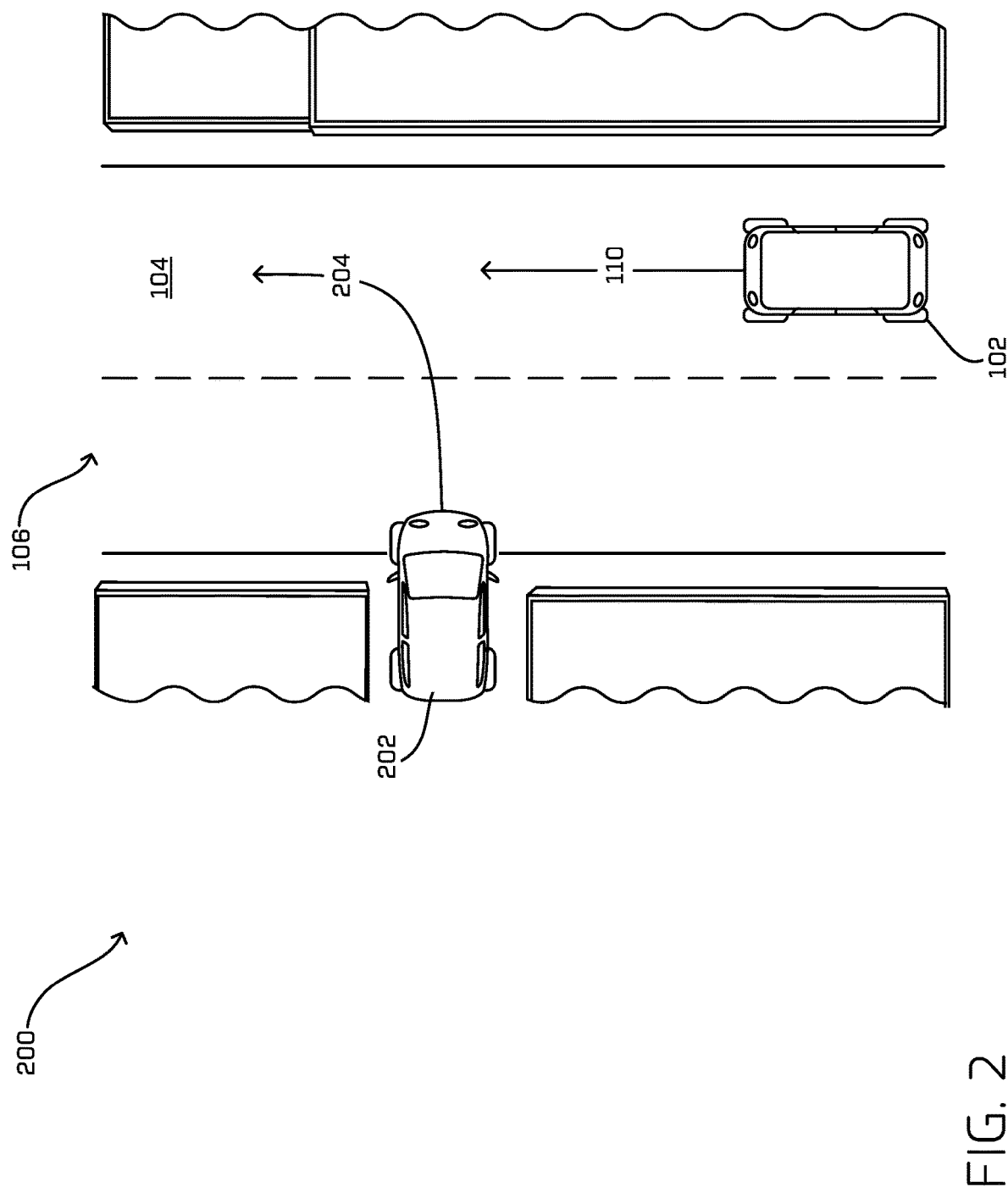
FIG. 2 illustrates another example environment for predicting whether a vehicle is going to enter a lane region in front of another vehicle, as described herein.

FIG. 2 illustrates another example environment 200 for predicting whether a vehicle is going to enter a lane region in front of another vehicle, as described herein.

The example environment 200 includes the vehicle 102, which can be positioned in the driving lane 104 of the driving surface 106. In at least one example, the driving lane 104 can be associated with a lane region and the driving surface 106 can be associated with a road, as described above with reference to FIG. 1. In at least one example, another vehicle 202 can be detected within the environment 200. In some examples, the other vehicle 202 can be proximate to the vehicle 102 such that the other vehicle 202 is within a threshold distance of the vehicle 102. Further, in some examples, the other vehicle 202 can be associated with a direction of travel that is different from the vehicle 102. The direction of travel of the vehicle 102 is illustrated by the arrow at the end of the trajectory 110 along which the vehicle 102 is travelling. In some examples, the other vehicle 202 can be associated with a direction of travel that is opposite the direction of travel of the vehicle 102. In some examples, the other vehicle 202 can be positioned at an angle to the vehicle 102. In at least one example, the angle can be within a designated offset of 90 degrees such that the other vehicle 202 is substantially perpendicular to the vehicle 102.

In FIG. 2, the other vehicle 202 is positioned substantially perpendicular to the vehicle 102. As a non-limiting example, the other vehicle 108 can be pulling out of a parking spot (e.g., a substantially perpendicular parking spot) or parking lot, an alley, a driveway, or any other location that is substantially perpendicular to the vehicle 102. In some examples, such a parking spot or parking lot, alley, driveway, etc. can be annotated in a map associated with the environment 200. In other examples, such a parking spot or parking lot, alley, driveway, etc. may not be annotated in the map.

In at least one example, the perception component can detect the other vehicle 202 and the prediction component can output a prediction indicating whether the other vehicle 202 is going to enter the lane region of the driving lane 104 in front of the vehicle 102. In some examples, the prediction component can leverage a model, trained by machine learning mechanism(s), to predict whether the other vehicle 202 is going to enter the lane region of the driving lane 104 in front of the vehicle 102. In at least one example, the prediction component can analyze feature(s) associated with the environment 200 and/or the other vehicle 202 to determine whether the other vehicle 202 is likely to enter the lane region of the driving lane 104, as described above.

As illustrated in FIG. 2, if the other vehicle 202 follows the trajectory 204 associated therewith, the other vehicle 202 will enter the lane region of the driving lane 104 in front of the vehicle 102 (e.g., as it performs a left turn into traffic). That is, if the other vehicle 202 follows the trajectory 204 associated therewith, the other vehicle 202 will perform a cut-in, such that the planning component associated with the vehicle 102 may modify its trajectory 110 to maneuver the vehicle 102 in view of the other vehicle 202. As described above, the planning component can cause the vehicle 102 to decelerate such to increase a follow distance between the vehicle 102 and the other vehicle 202, cause the vehicle 102 to decelerate to yield to the other vehicle 202 and/or stop, and/or cause the vehicle 102 to perform any other combination of maneuvers the vehicle 102 is capable of performing.

FIGS. 1 and 2 illustrate examples of techniques described herein whereby the other vehicle 108 and 202, respectively, are pulling out of an alley, parking spot (e.g., substantially perpendicular parking spot) or parking lot, driveway, or other location that is substantially perpendicular to the vehicle 102 and/or the driving surface 106. In FIG. 1, the other vehicle 108 is positioned in an alley, parking spot (e.g., substantially perpendicular parking spot) or parking lot, driveway, or other location that is on a same side of the driving surface 106 as the vehicle 102. That is, the other vehicle 108 is positioned substantially perpendicular to, and on a same side of the driving surface 106 as, the driving lane 104 in which the vehicle 102 is positioned. In FIG. 2, the other vehicle 202 is positioned in an alley, parking spot (e.g., substantially perpendicular parking spot) or parking lot, driveway, or other location that is on an opposite side of the driving surface 106 as the vehicle 102. That is, the other vehicle 108 is positioned substantially perpendicular to, and on an opposite side of the driving surface 106 as, the driving lane 104 in which the vehicle 102 is positioned.

In some examples, the other vehicle 108 or 202 can be positioned in front of the vehicle 102 and positioned substantially parallel (e.g., in a same direction as) the vehicle 102. In such examples, the other vehicle 108 or 202 can perform a left or right turn across the driving lane 104. The vehicle 102 can leverage feature(s) as described above to predict such a maneuver and the planning component can determine how to control the vehicle 102 accordingly.

Figure 3:
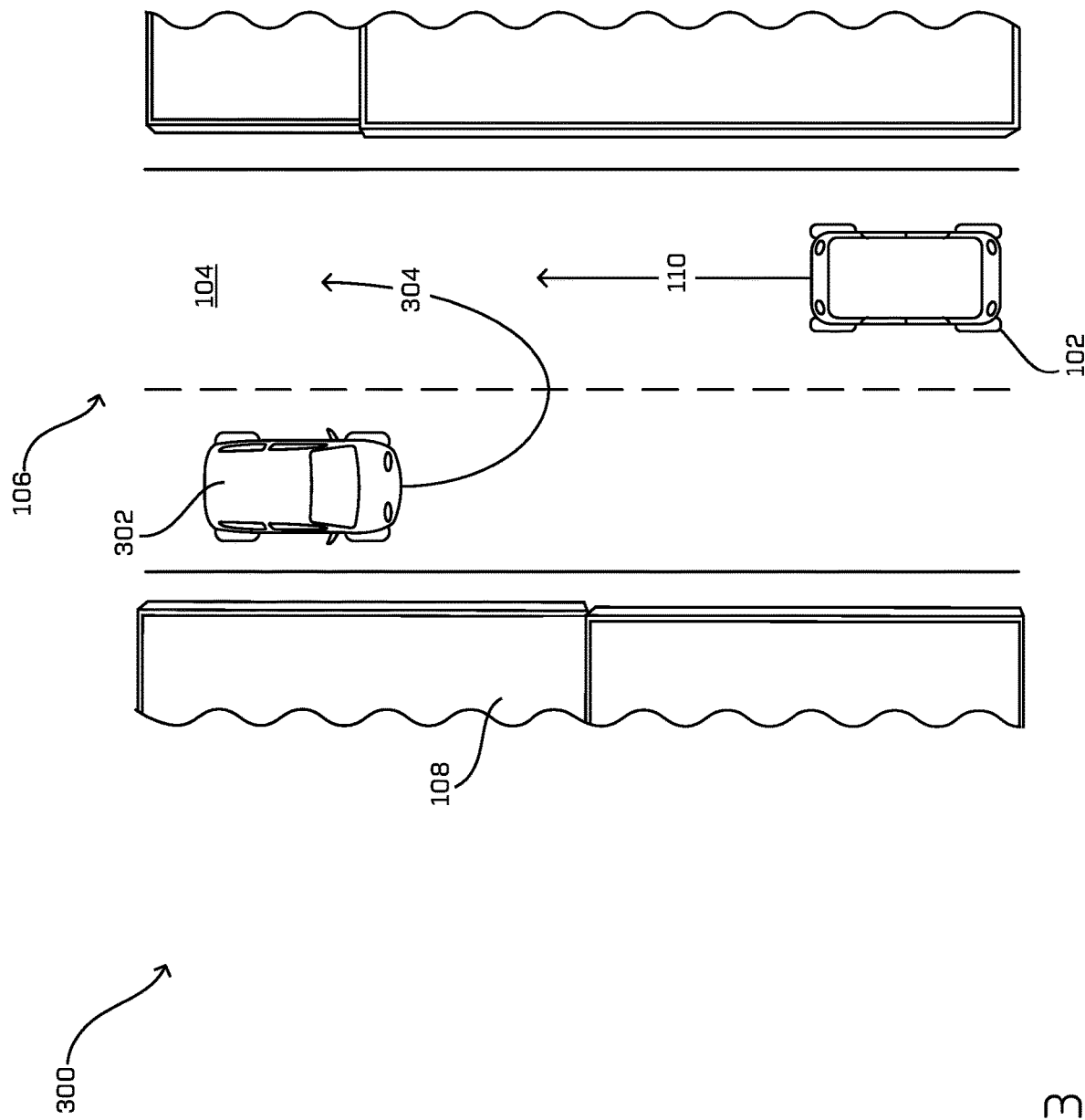
FIG. 3 illustrates another example environment for predicting whether a vehicle is going to enter a lane region in front of another vehicle, as described herein.

FIG. 3 illustrates another example environment 300 for predicting whether a vehicle is going to enter a lane region in front of another vehicle, as described herein.

The example environment 300 includes the vehicle 102, which can be positioned in the driving lane 104 of the driving surface 106. In at least one example, the driving lane 104 can be associated with a lane region and the driving surface 106 can be associated with a road, as described above with reference to FIG. 1. In at least one example, another vehicle 302 can be detected within the environment 300. In some examples, the other vehicle 302 can be proximate to the vehicle 102 such that the other vehicle 302 is within a threshold distance of the vehicle 102. Further, in some examples, the other vehicle 302 can be associated with a direction of travel that is different from the vehicle 102. The direction of travel of the vehicle 102 is illustrated by the arrow at the end of the trajectory 110 along which the vehicle 102 is travelling. In some examples, the other vehicle 302 can be associated with a direction of travel that is opposite the direction of travel of the vehicle 102 (e.g., as illustrated in FIG. 3). In some examples, the other vehicle 302 can be positioned at an angle to the vehicle 102.

In at least one example, the perception component can detect the other vehicle 302 and the prediction component can predict whether the other vehicle 302 is going to enter the lane region of the driving lane 104 in front of the vehicle 102. In some examples, the prediction component can leverage a model, trained by machine learning mechanism(s), to output a prediction indicating whether the other vehicle 302 is going to enter the lane region of the driving lane 104 in front of the vehicle 102. In at least one example, the prediction component can analyze feature(s) associated with the environment 300 and/or the other vehicle 302 to determine whether the other vehicle 302 is likely to enter the lane region of the driving lane 104, as described above.

As illustrated in FIG. 3, if the other vehicle 302 follows the trajectory 304 associated therewith, the other vehicle 302 will enter the lane region of the driving lane 104 in front of the vehicle 102 (e.g., as it performs a U-turn). That is, if the other vehicle 302 follows the trajectory 304 associated therewith, the other vehicle 302 will perform a cut-in, such that the planning component associated with the vehicle 102 may modify its trajectory 110 to maneuver the vehicle 102 in view of the other vehicle 302. As described above, the planning component can cause the vehicle 102 to decelerate such to increase a follow distance between the vehicle 102 and the other vehicle 302, cause the vehicle 102 to decelerate to yield to the other vehicle 302 and/or stop, and/or cause the vehicle 102 to perform any other combination of maneuvers the vehicle 102 is capable of performing.

While FIG. 3 illustrates the other vehicle 302 performing a u-turn, in an alternative example, the other vehicle 302 may perform a turn across the driving lane 104 (e.g., into a driveway, street, alley, or the like). In such an example, the vehicle 102 can leverage the same feature(s) to determine whether the other vehicle 302 is likely to enter the lane region of the driving lane 104 in front of the vehicle 102 and the planning component can determine how to control the vehicle 102 accordingly.

Figure 4:
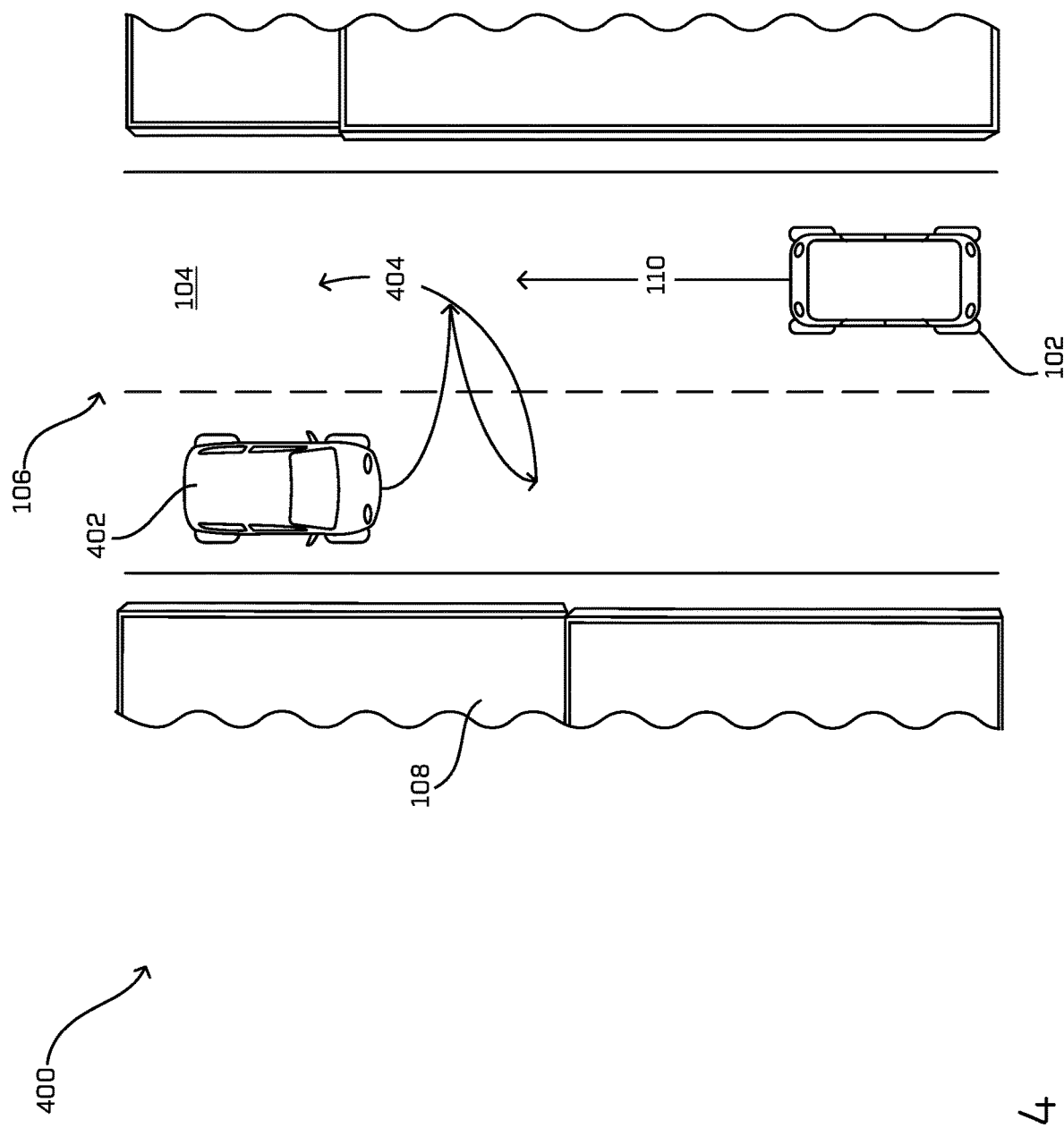
FIG. 4 illustrates another example environment for predicting whether a vehicle is going to enter a lane region in front of another vehicle, as described herein.

FIG. 4 illustrates another example environment 400 for predicting whether a vehicle is going to enter a lane region in front of another vehicle, as described herein.

The example environment 400 includes the vehicle 102, which can be positioned in the driving lane 104 of the driving surface 106. In at least one example, the driving lane 104 can be associated with a lane region and the driving surface 106 can be associated with a road, as described above with reference to FIG. 1. In at least one example, another vehicle 402 can be detected within the environment 400. In some examples, the other vehicle 402 can be proximate to the vehicle 102 such that the other vehicle 402 is within a threshold distance of the vehicle 102. Further, in some examples, the other vehicle 402 can be associated with a direction of travel that is different from the vehicle 102. The direction of travel of the vehicle 102 is illustrated by the arrow at the end of the trajectory 110 along which the vehicle 102 is travelling. In some examples, the other vehicle 402 can be associated with a direction of travel that is opposite the direction of travel of the vehicle 102 (e.g., as illustrated in FIG. 4). In some examples, the other vehicle 402 can be positioned at an angle to the vehicle 102.

In at least one example, the perception component can detect the other vehicle 402 and the prediction component can predict whether the other vehicle 402 is going to enter the lane region of the driving lane 104 in front of the vehicle 102. In some examples, the prediction component can leverage a model, trained by machine learning mechanism(s), to output a prediction indicating whether the other vehicle 402 is going to enter the lane region of the driving lane 104 in front of the vehicle 102. In at least one example, the prediction component can analyze feature(s) associated with the environment 400 and/or the other vehicle 402 to determine whether the other vehicle 402 is likely to enter the lane region of the driving lane 104, as described above.

As illustrated in FIG. 4, if the other vehicle 402 follows the trajectory 404 associated therewith, the other vehicle 402 will enter the lane region of the driving lane 104 in front of the vehicle 102 (e.g., as it performs a three-point turn, or any N-point turn). That is, if the other vehicle 402 follows the trajectory 404 associated therewith, the other vehicle 402 will perform a cut-in, such that the planning component associated with the vehicle 102 may modify its trajectory 110 to maneuver the vehicle 102 in view of the other vehicle 402. As described above, the planning component can cause the vehicle 102 to decelerate such to increase a follow distance between the vehicle 102 and the other vehicle 402, cause the vehicle 102 to decelerate to yield to the other vehicle 402 and/or stop, and/or cause the vehicle 102 to perform any other combination of maneuvers the vehicle 102 is capable of performing.

Figure 5:
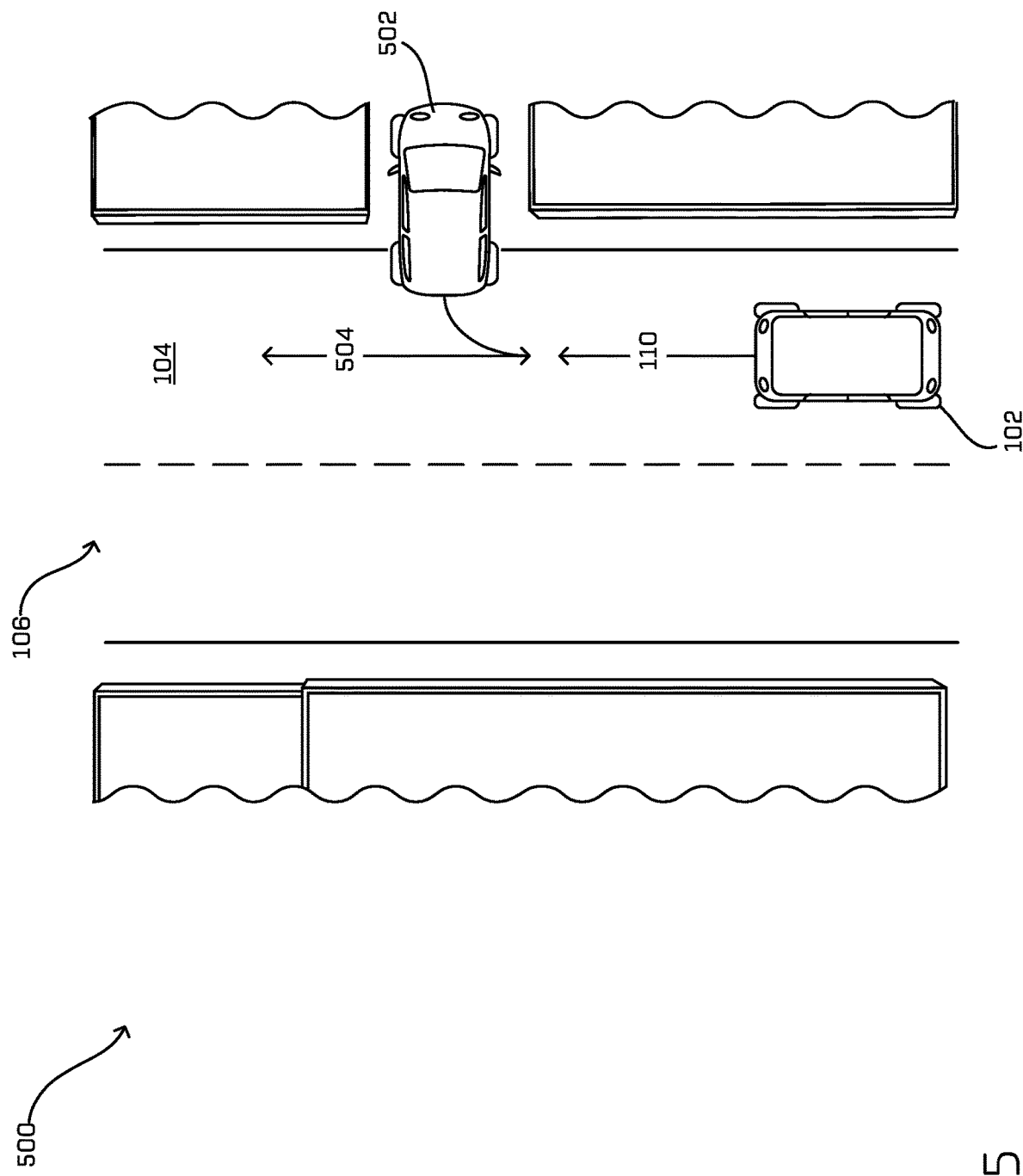
FIG. 5 illustrates another example environment for predicting whether a vehicle is going to enter a lane region in front of another vehicle, as described herein.

FIG. 5 illustrates another example environment 500 for predicting whether a vehicle is going to enter a lane region in front of another vehicle, as described herein.

The example environment 500 includes the vehicle 102, which can be positioned in the driving lane 104 of the driving surface 106. In at least one example, the driving lane 104 can be associated with a lane region and the driving surface 106 can be associated with a road, as described above with reference to FIG. 1. In at least one example, another vehicle 502 can be detected within the environment 500. In some examples, the other vehicle 502 can be proximate to the vehicle 102 such that the other vehicle 502 is within a threshold distance of the vehicle 102. Further, in some examples, the other vehicle 502 can be associated with a direction of travel that is different from the vehicle 102. The direction of travel of the vehicle 102 is illustrated by the arrow at the end of the trajectory 110 along which the vehicle 102 is travelling. In some examples, the other vehicle 502 can be associated with a direction of travel that is opposite the direction of travel of the vehicle 102. In some examples, the other vehicle 502 can be positioned at an angle to the vehicle 102. As illustrated in FIG. 5, the other vehicle 502 can be substantially perpendicular to the vehicle 102.

In at least one example, the perception component can detect the other vehicle 502 and the prediction component can predict whether the other vehicle 502 is going to enter the lane region of the driving lane 104 in front of the vehicle 102. In some examples, the prediction component can leverage a model, trained by machine learning mechanism(s), to output a prediction indicating whether the other vehicle 502 is going to enter the lane region of the driving lane 104 in front of the vehicle 102. In at least one example, the prediction component can analyze feature(s) associated with the environment 500 and/or the other vehicle 502 to determine whether the other vehicle 502 is likely to enter the lane region of the driving lane 104, as described above.

As illustrated in FIG. 5, if the other vehicle 502 follows the trajectory 504 associated therewith, the other vehicle 502 will enter the lane region of the driving lane 104 in front of the vehicle 102 (e.g., as it reverses from its current position and proceeds in the same direction of travel as the vehicle 102). That is, if the other vehicle 502 follows the trajectory 504 associated therewith, the other vehicle 502 will perform a cut-in, such that the planning component associated with the vehicle 102 may modify its trajectory 110 to maneuver the vehicle 102 in view of the other vehicle 502. As described above, the planning component can cause the vehicle 102 to decelerate such to increase a follow distance between the vehicle 102 and the other vehicle 502, cause the vehicle 102 to change lanes, cause the vehicle 102 to decelerate to yield to the other vehicle 502 and/or stop, cause the vehicle 102 to safely maneuver around the other vehicle 502, and/or cause the vehicle 102 to perform any other combination of maneuvers the vehicle 102 is capable of performing.

While FIG. 5 illustrates the other vehicle 502 reversing out of a driveway, parking spot, alley, or the like on a same side of the driving surface 106 as the vehicle 102, techniques described herein are also applicable for another vehicle 502 that is reversing out of a driveway, parking spot, alley, or the like on an opposite side of the driving surface 106 as the vehicle 102.

FIGS. 1-5 illustrate various examples of other vehicles that are proximate to the vehicle 102 that are entering a lane region of the driving lane 104 in front of the vehicle 102 or are otherwise performing a "cut-in maneuver," as described herein. Such examples include left turns, right turns, U-turns, three-point turns, and the like. Additional or alternative examples are within the scope of this disclosure. For instance, techniques described herein can be used for determining how to control the vehicle 102 when another vehicle performs a K-turn, any N-point turn, or the like, or another vehicle turning into or out of traffic. That is, techniques described herein are not limited to the examples described in FIGS. 1-5 and can be applicable to any example where another vehicle that is proximate to and associated with a same or different direction of travel than the vehicle 102 enters—or is predicted to enter—a lane region of the driving lane 104 in front of the vehicle 102. Furthermore, techniques described herein are applicable to scenarios where another vehicle is entering a lane region from a position on-road (e.g., on the driving surface 106) or off-road (e.g., not on the driving surface 106).

Figure 6:
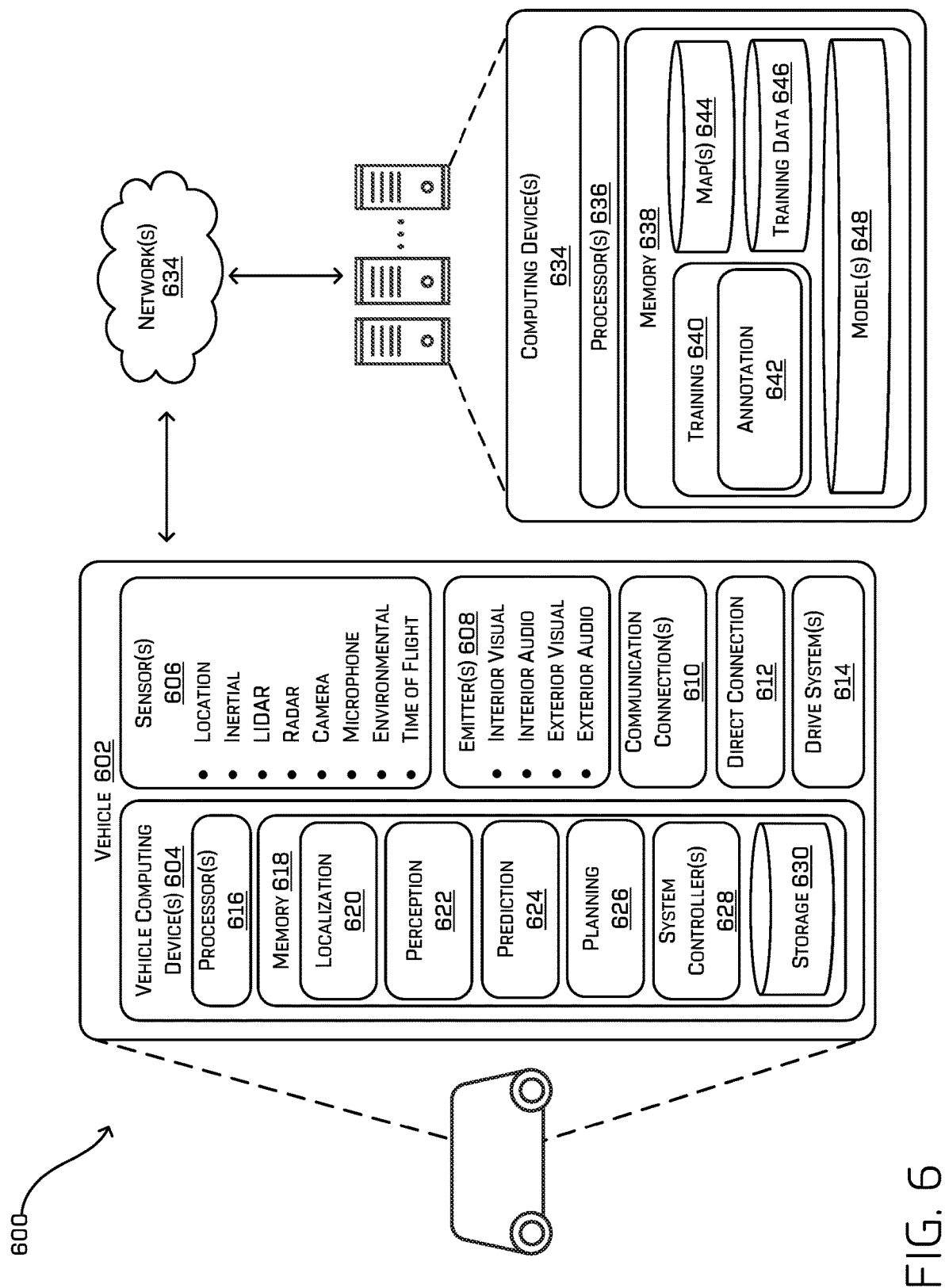
FIG. 6 is a block diagram illustrating an example system for performing techniques, as described herein.

FIG. 6 is a block diagram illustrating an example system 600 for performing techniques, as described herein. In at least one example, a vehicle 602 can include one or more vehicle computing devices 604, one or more sensor components 606, one or more emitters 608, one or more communication connections 610, at least one direct connection 612, and one or more drive systems 614. In at least one example, a vehicle 602 can correspond to the vehicle 102 described above with reference to FIG. 1. As described above with reference to FIG. 1, in the illustrated example, the vehicle 602 is an autonomous vehicle; however, the vehicle 602 could be any other type of vehicle. While only a single vehicle 602 is illustrated in FIG. 6, in a practical application, the example system 600 can include a plurality of vehicles, which, in some examples, can comprise a fleet of vehicles.

The vehicle computing device(s) 604 can include processor(s) 616 and memory 618 communicatively coupled with the processor(s) 616. In the illustrated example, the memory 618 of the vehicle computing device(s) 604 stores a localization component 620, a perception component 622, a prediction component 624, a planning component 626, and one or more system controllers 628. Additionally, the memory 618 can include a storage 630, which can store map(s), model(s), previous outputs, etc. A map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. Model(s) can include machine-trained models, as described below. In some examples, the storage 630 can store previous outputs.

In at least one example, the localization component 620 can determine a pose (position and orientation) of the vehicle 602 in relation to a local and/or global map based at least in part on sensor data received from the sensor component(s) 606 and/or map data associated with a map (e.g., of the map(s)). In at least one example, the localization component 620 can include, or be associated with, a calibration component that is capable of performing operations for calibrating (determining various intrinsic and extrinsic parameters associated with any one or more of the sensor component(s) 606), localizing, and mapping substantially simultaneously.

In at least one example, the perception component 622 can perform object detection, segmentation, and/or classification based at least in part on sensor data received from the sensor component(s) 606. In at least one example, the perception component 622 can receive raw sensor data (e.g., from the sensor component(s) 606). In at least one example, the perception component 622 can receive sensor data and can utilize one or more processing algorithms to perform object detection, segmentation, and/or classification with respect to object(s) identified in the sensor data. In some examples, the perception component 622 can associate a bounding region (or otherwise an instance segmentation) with an identified object and can associate a confidence score associated with a classification of the identified object with the identified object. In some examples, objects, when rendered via a display, can be colored based on their perceived class.

The prediction component 624 can receive sensor data from the sensor component(s) 606, map data associated with a map (e.g., of the map(s) which can be in storage 630), and/or perception data output from the perception component 622 (e.g., processed sensor data), and can output predictions associated with one or more objects within the environment of the vehicle 602. In at least one example, the planning component 626 can determine outputs, to use to control the vehicle 602 based at least in part on sensor data received from the sensor component(s) 606, map data, and/or any determinations made by the other components of the vehicle 602.

Additional details of localization components, perception components, prediction components, and/or planning components that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 602 is not an autonomous vehicle), one or more of the aforementioned components can be omitted from the vehicle 602. While the components described above are illustrated as "onboard" the vehicle 602, in other implementations, the components can be remotely located and/or accessible to the vehicle 602. Furthermore, while the components are described above as "components," such components can comprise one or more components, which can be part of a system, for performing operations attributed to each of the components.

In at least one example, the localization component 620, the perception component 622, the prediction component 624, and/or the planning component 626 can process sensor data, as described above, and can send their respective outputs over network(s) 632, to computing device(s) 634. In at least one example, the localization component 620, the perception component 622, the prediction component 624, and/or the planning component 626 can send their respective outputs to the computing device(s) 634 at a particular frequency, after a lapse of a predetermined period of time, in near real-time, etc.

In at least one example, the vehicle computing device(s) 604 can include one or more system controllers 628, which can be configured to control steering, propulsion, braking, safety, emitters, communication, and other systems of the vehicle 602. These system controller(s) 628 can communicate with and/or control corresponding systems of the drive system(s) 614 and/or other systems of the vehicle 602.

In at least one example, the sensor component(s) 606 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 606 can provide input to the vehicle computing device(s) 604. In some examples, the sensor component(s) 606 can preprocess at least some of the sensor data prior to sending the sensor data to the vehicle computing device(s) 604. In at least one example, the sensor component(s) 606 can send sensor data, via the network(s) 632, to the computing device(s) 634 at a particular frequency, after a lapse of a predetermined period of time, in near real-time, etc.

The vehicle 602 can also include one or more emitters 608 for emitting light and/or sound, as described above. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 608 can be positioned at various locations about the exterior and/or interior of the vehicle 602.

The vehicle 602 can also include communication connection(s) 610 that enable communication between the vehicle 602 and other local or remote computing device(s). For instance, the communication connection(s) 610 can facilitate communication with other local computing device(s) on the vehicle 602 and/or the drive system(s) 614. Also, the communication connection(s) 610 can allow the vehicle to communicate with other nearby computing device(s) (e.g., other nearby vehicles, traffic signals, etc.). The communications connection(s) 610 also enable the vehicle 602 to communicate with a remote teleoperations computing device or other remote services.

The communications connection(s) 610 can include physical and/or logical interfaces for connecting the vehicle computing device(s) 604 to another computing device or a network, such as network(s) 632. For example, the communications connection(s) 610 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 612 can directly connect the drive system(s) 614 and other systems of the vehicle 602.

In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include sensor component(s) to detect conditions of the drive system(s) 614 and/or the surroundings of the vehicle 602. By way of example and not limitation, the sensor component(s) can include wheel encoder(s) (e.g., rotary encoders) to sense rotation of the wheels of the drive system, inertial sensors (e.g., inertial measurement units, accelerometers, gyroscopes, magnetometers, etc.) to measure position and acceleration of the drive system, cameras or other image sensors, ultrasonic sensors to acoustically detect objects in the surroundings of the drive system, lidar sensors, radar sensors, etc. Some sensors, such as the wheel encoder(s), can be unique to the drive system(s) 614. In some cases, the sensor component(s) on the drive system(s) 614 can overlap or supplement corresponding systems of the vehicle 602 (e.g., sensor component(s) 606).

The drive system(s) 614 can include many of the vehicle systems, including a high voltage battery, a motor to propel the vehicle 602, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor component(s) and to control operation of the various vehicle systems. In some examples, the drive system controller can include processor(s) and memory communicatively coupled with the processor(s). The memory can store one or more components to perform various functionalities of the drive system(s) 614. Furthermore, the drive system(s) 614 also include communication connection(s) that enable communication by the respective drive system with other local or remote computing device(s).

In FIG. 6, the vehicle computing device(s) 604, sensor component(s) 606, emitter(s) 608, and the communication connection(s) 610 are shown onboard the vehicle 602. However, in some examples, the vehicle computing device(s) 604, sensor component(s) 606, emitter(s) 608, and the communication connection(s) 610 can be implemented outside of an actual vehicle (i.e., not onboard the vehicle 602).

As described above, the vehicle 602 can send sensor data to the computing device(s) 634, via the network(s) 632. In some examples, the vehicle 602 can send raw sensor data to the computing device(s) 634. In other examples, the vehicle 602 can send processed sensor data and/or representations of sensor data to the computing device(s) 634 (e.g., data output from the localization component 620, the perception component 622, the prediction component 624, and/or the planning component 626). In some examples, the vehicle 602 can send sensor data to the computing device(s) 634 at a particular frequency, after a lapse of a predetermined period of time, in near real-time, etc.

The computing device(s) 634 can receive the sensor data (raw or processed) from the vehicle 602 and/or other data collection devices, as well as data from one or more third party sources and/or systems. In at least one example, the computing device(s) 634 can include processor(s) 636 and memory 638 communicatively coupled with the processor(s) 636. In the illustrated example, the memory 638 of the computing device(s) 634 stores a training component 640, which can include an annotation component 642, a map(s) storage 644 (e.g., storing one or more maps), a training data storage 646 (e.g., storing training data accessible to the training component 640), and a model(s) storage 648 (e.g., models output by the training component 640). In some examples, one or more of the systems and/or storage repositories can be associated with the vehicle 602 or other computing device(s) associated with the system 600 instead of, or in addition to, being associated with the memory 638 of the computing device(s) 634.

In at least one example, the training component 640 can train model(s), which can be used for various operations as described herein. That is, the training component 640 can train model(s) that can be used for predicting whether a first vehicle is going to enter a driving lane in front of another vehicle (e.g., the vehicle 602). In at least one example, the annotation component 642 can receive or otherwise determine annotated data based at least in part on sensor data and/or log data associated with the sensor data received from one or more vehicles, as described below. Details associated with training the model(s), as used herein, are described below with reference to FIG. 7. In at least one example, the resulting model(s) can be stored in the model(s) storage 648 and/or the storage 630 on the vehicle 602 and can be accessed in near real-time by one or more components of the vehicle computing device(s) 604.

The processor(s) 616 of the vehicle 602 and the processor(s) 636 of the computing device(s) 634 can be any suitable processor capable of executing instructions to process data and perform operations as described herein. By way of example and not limitation, the processor(s) 616 and 636 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 638 are examples of non-transitory computer-readable media. Memory 618 and 638 can store an operating system and one or more software applications, instructions, programs, and/or data to implement the methods described herein and the functions attributed to the various systems. In various implementations, the memory can be implemented using any suitable memory technology, such as static random receive memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in some examples, components of the vehicle 602 can be associated with the computing device(s) 634 and/or the components of the computing device(s) 634 can be associated with the vehicle 602. That is, the vehicle 602 can perform one or more of the functions associated with the computing device(s) 634, and vice versa.

Figure 7:
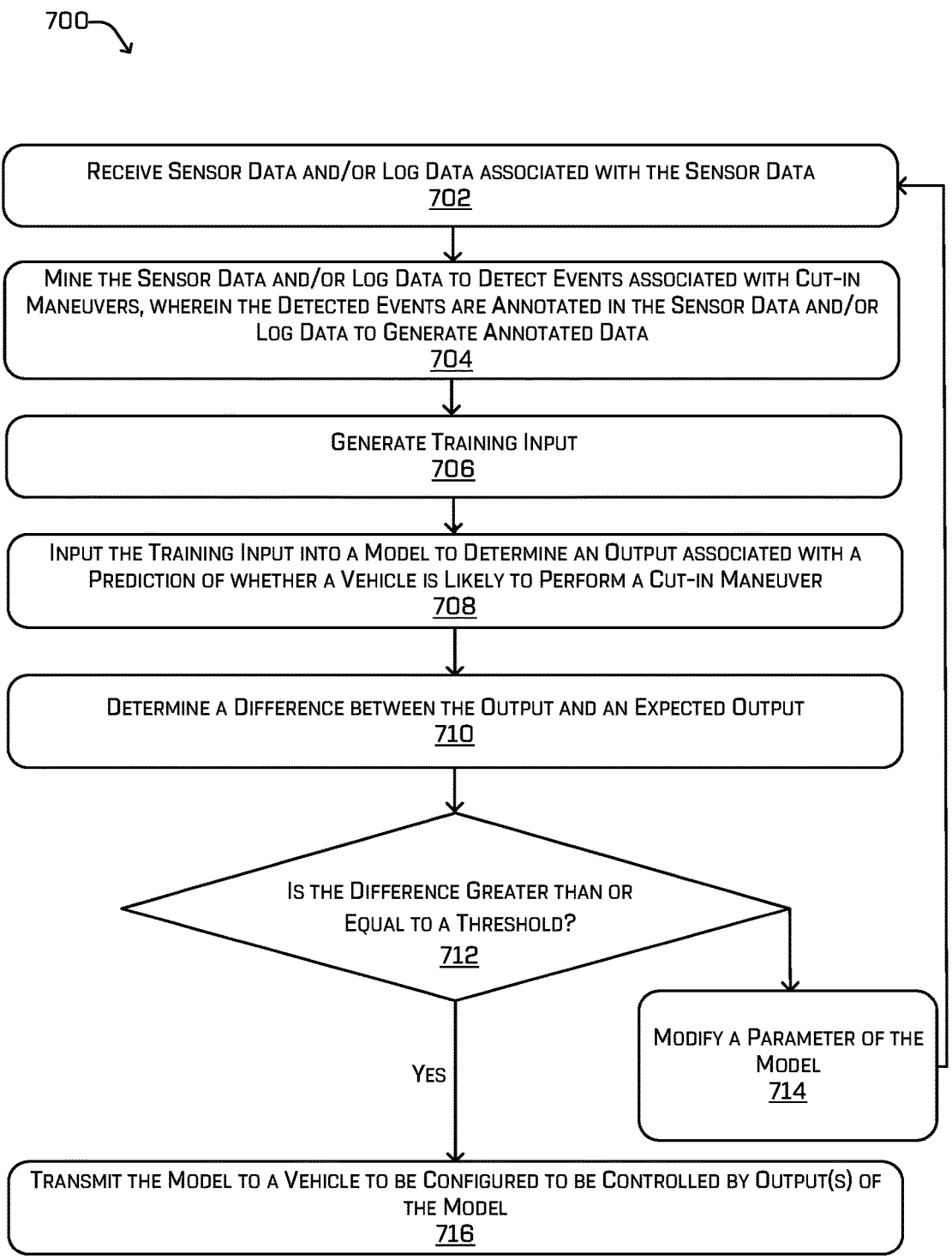
FIG. 7 illustrates an example process for training a model for predicting whether a vehicle is going to enter a lane region in front of another vehicle, as described herein.
Figure 8:
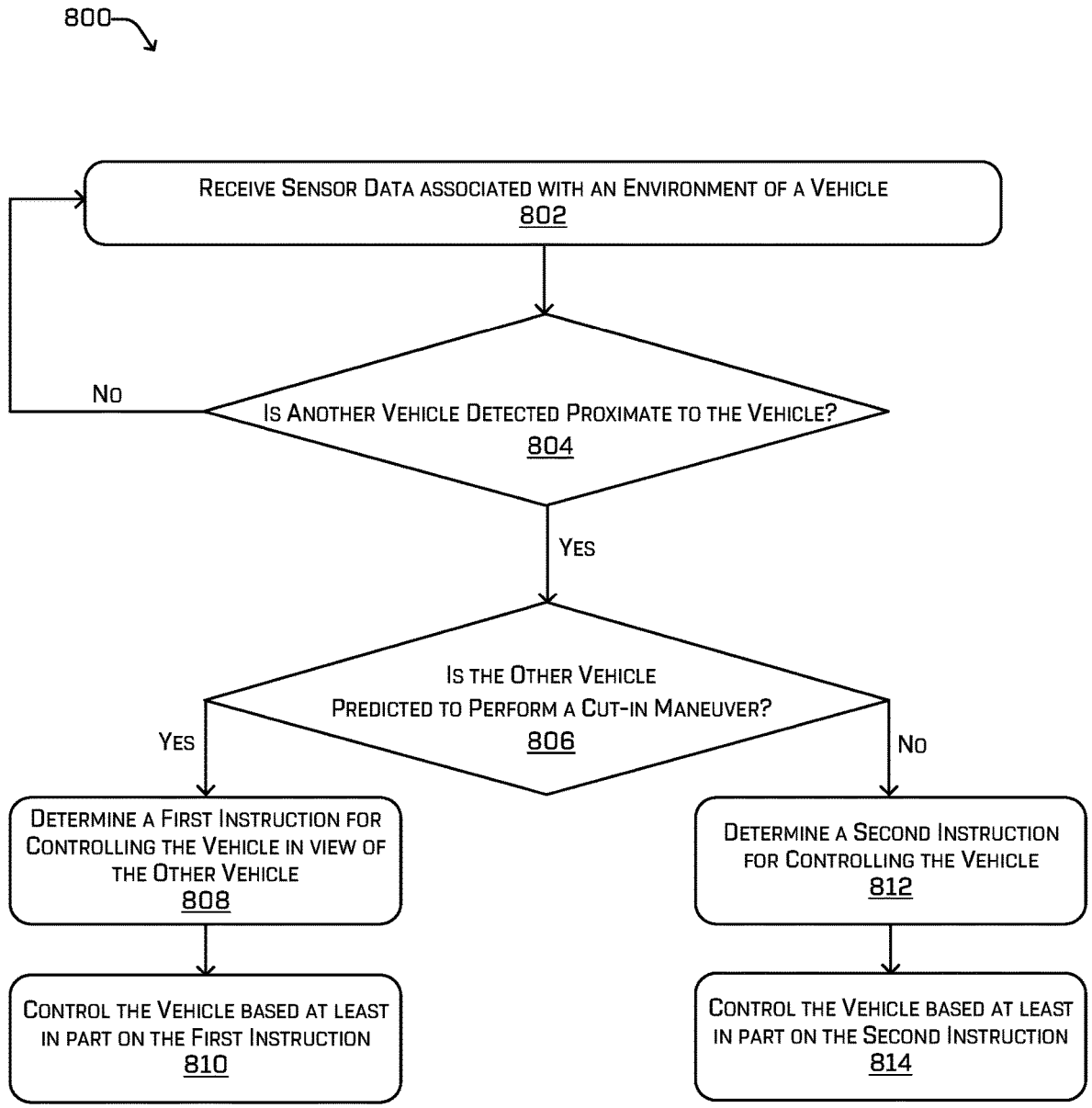
FIG. 8 illustrates an example process for predicting whether a vehicle is going to enter a lane region in front of another vehicle, and controlling the other vehicle based on such a prediction, as described herein.

FIGS. 7 and 8 are flowcharts showing example processes involving techniques as described herein. The processes illustrated in FIGS. 7 and 8 are described with reference to the system 600 shown in FIG. 6 for convenience and ease of understanding. However, the processes illustrated in FIGS. 7 and 8 are not limited to being performed using the system 600. Moreover, the system 600 described herein is not limited to performing the processes illustrated in FIGS. 7 and 8.

The processes 700 and 800 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes 700 and 800 can be combined in whole or in part with each other or with other processes.

FIG. 7 illustrates an example process 700 for training a model for predicting whether a vehicle is going to enter a lane region in front of another vehicle (e.g., perform a cut-in maneuver), as described herein.

Block 702 illustrates receiving sensor data and/or log data associated with the sensor data. As described above, individual vehicles, such as the vehicle 602, can include sensor component(s) 606. In at least one example, the sensor component(s) 606 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 606 can provide input to the vehicle computing device(s) 604. In some examples, the sensor component(s) 606 can preprocess at least some of the sensor data prior to sending the sensor data to the vehicle computing device(s) 604. In at least one example, the sensor component(s) 606 can send sensor data, via the network(s) 632, to the computing device(s) 634 at a particular frequency, after a lapse of a predetermined period of time, in near real-time, etc.

In at least one example, a plurality of vehicles (e.g., a fleet of vehicles) can send sensor data, via the network(s) 632, to the computing device(s) 634. In some examples, such sensor data can be associated with driving logs (i.e., "log data"), which can indicate how individual vehicles of the plurality of vehicles moved within respective environments over time. That is, such driving logs can be historical driving logs indicating the movement of individual vehicles of the plurality of vehicles over time. In some examples, such driving logs can comprise sensor data—which can include output(s) of individual sensor(s) at a particular instance of time—that is received over time. In some examples, such driving logs can comprise outputs based on the sensor data (e.g., processed sensor data) associated with a period of time. That is, in some examples, log data can include raw sensor data received from the sensor component(s) 606, as well as one or more downstream outputs (e.g., perception outputs, prediction outputs, planner outputs, control outputs, and the like) for individual messages during a drive mission of a vehicle, such as the vehicle 602.

In at least one example, the training component 640 of the computing device(s) 634 can receive sensor data and/or associated driving logs from the plurality of vehicles.

Block 704 illustrates mining the sensor data and/or the log data to detect events associated with cut-in maneuvers (e.g., any one or more of the maneuvers described in detail herein (whether or not the cut-in maneuver is relative to a second vehicle)), wherein the detected events are annotated in the sensor data and/or log data to generate annotated data. In at least one example, the training component 640 can mine (e.g., analyze) the sensor data and/or the log data to detect when a vehicle performs a cut-in maneuver (e.g., which can be associated with a left turn (e.g., from a parking spot (e.g., substantially perpendicular parking spot) or parking lot, an alley, a driveway, or the like), a right turn (e.g., from a parking spot (e.g., substantially perpendicular parking spot) or parking lot, an alley, a driveway, or the like), a U-turn, a K-turn, an N-point turn, or the like). For example, the training component 640 can analyze the sensor data and/or the log data to detect when a vehicle is misaligned with a driving surface, for instance, when the vehicle is substantially perpendicular to a driving surface, and subsequently becomes aligned with, or substantially parallel to, the driving surface. In at least one example, the annotation component 642 can automatically annotate the sensor data and/or the log data to indicate the occurrence of cut-in maneuvers.

In at least one example, the annotation component 642 can determine a period of time associated with a cut-in maneuver. That is, the annotation component 642 can access sensor data and/or log data leading up to a detected event (e.g., associated with a cut-in maneuver), and can determine when the detected event started and ended. For a moving vehicle (e.g., a vehicle making a u-turn, k-point turn, n-point turn, etc.), the annotation component 642 can backout (e.g., in the log data) to a first time that the vehicle starts to diverge from a driving lane to determine a start time associated with the event. For instance, the annotation component 642 can determine that a position of the vehicle changes from being substantially parallel to a centerline of a driving surface (e.g., a road, a lane, etc.) to being within a designated offset of 90 degrees of the centerline (e.g., substantially perpendicular to the centerline) and can determine the start time associated with the event accordingly. For a stopped vehicle (e.g., parked, idling in a driveway or alley, etc.), the annotation component 642 can utilize changes in velocity to determine when the vehicle starts to perform a cut-in maneuver. For example, the annotation component 642 can determine a first time when the vehicle moves from a zero velocity to a non-zero velocity to determine a start time associated with the event. In at least one example, the end time can correspond to when the event occurs.

Block 706 illustrates generating training data. In at least one example, the training component 640 can access sensor data and/or log data leading up to a detected event (e.g., associated with a cut-in maneuver), and can generate multi-channel image(s) associated with such sensor data and/or log data. In at least one example, the annotation component 642 can determine when the event associated with the cut-in maneuver started and ended, as described above, and can access sensor data and/or log data from the start time to just prior to the occurrence of the event. For instance, the training component 640 can access 1-10 seconds of sensor data and/or log data prior to a detected event, which can be used to generate multi-channel image(s) representing the state of the environment and/or the vehicle prior to the occurrence of the detected event.

In at least one example, the sensor data and/or log data can be encoded into a multi-channel image or images. Each channel can correspond to a feature which for a vehicle that is detected as performing a cut-in maneuver, can include, but is not limited to, annotations in map(s) associated with environment(s) indicating parking spot(s) (e.g., substantially perpendicular parking spot(s)) or parking lot(s), alley(s), driveway(s), and the like), positions of a vehicle (e.g., direction of travel, angular offset from another vehicle, etc.), an instantaneous velocity of the vehicle, an indication of whether a driver is in the vehicle, an indication of a direction that the driver is looking (e.g., head direction of the driver), an indication of whether a door associated with the vehicle is open or closed, an indication of whether an engine of the vehicle is in a running state or off state, a wheel angle associated with wheel(s) of the vehicle, an indication of whether a brake light of the vehicle is illuminated, an indication of whether a headlight of the vehicle is illuminated, an indication of whether a reverse light of the vehicle is illuminated, an indication of whether a blinker of the vehicle is illuminated, or a lighting state associated with the vehicle, etc. In at least one example, each channel can be associated with a top-down view of the environment. That is, a channel can represent sensor output or information based on a sensor output that is modeled in a top-down representation. The channel(s) can then be input into a model, such as a multi-layer model, a convolutional neural network, or the like. Additional details associated with top-down convolutional neural networks are described in U.S. patent application Ser. No. 16/420,050, which was filed on May 22, 2019, and U.S. patent application Ser. No. 16/504,147, which was filed on Jul. 5, 2019, the entire contents of both of which are incorporated by reference herein. Of course, though described above with respect to a multi-channel image, any number of multi-channel images (which may represent a series of time prior to the most recent time step) and/or any other data structure are contemplated.

In some examples, the training data, and associated sensor data and/or log data, can be referred to as ground truth.

Block 708 illustrates inputting the training data into a model to determine an output associated with an indication whether a vehicle is likely to perform a cut-in maneuver. In at least one example, the training data can be analyzed by the training component 640 using a machine learning mechanism. For instance, in at least one example, a model can be trained using a neural network (e.g., a convolutional neural network, etc.) and the training data. That is, the training data can be input into a model (e.g., a top-down convolutional neural network, etc.) to determine an output associated with a prediction of whether a vehicle will enter a lane in front of another vehicle or otherwise perform a maneuver described herein as a "cut-in maneuver." Such a "prediction" can be a detection of a cut-in maneuver, a prediction of a future lane or position in the environment, or something in between. In some examples, the output can be a binary indicator (e.g., "yes" or "no"), indicating whether the vehicle is going to enter the driving lane of the other vehicle in front of the other vehicle or not. In some examples, the output can be associated with a confidence score. In some examples, the output can be a percentage or other metric indicating a certainty of whether a vehicle is going to enter the driving lane of another vehicle in front of the other vehicle. As described above, in some examples, the output can be associated with a predicted lane or position in the environment.

Block 710 illustrates determining a difference between the output and an expected output associated with the training data. In at least one example, the resulting model can determine an output associated with a prediction whether a vehicle will enter a lane in front of another vehicle or otherwise perform a cut-in maneuver, as described herein. The training component 640 can compare the output with an expected output associated with the training data, which can be based at least in part on the annotated data, to determine a difference. In at least one example, the training component 640 can modify one or more parameters of the model based at least in part on the difference (e.g., via gradient descent, back-propagation, and the like).

Block 712 illustrates determining whether the difference is greater than or equal to a threshold. In at least one example, the training component 640 can determine whether the difference is greater than or equal to a threshold. If the difference is greater than or equal to the threshold, the training component 640 can modify a parameter of the model, as illustrated in block 714, and the process 700 can return to block 702. If the difference is less than the threshold, the training component 640 can transmit the model to the model(s) storage 648 and/or storage on a vehicle, such as the storage 630 on the vehicle 602. In some examples, and as illustrated in block 716, the model can be transmitted to a vehicle, such as the vehicle 602, that can be configured to be controlled by output(s) of the model. In such an example, the resulting model can be stored in the storage 630 on the vehicle 602 and can be accessed in near real-time by one or more components of the vehicle computing device(s) 604, as described below with reference to FIG. 8.

In at least one example, the training component 640 can train model(s) using machine learning techniques. Block 708 makes reference to one or more neural networks that can be used to train the model. Additional or alternative machine learning algorithms can be used for training the model. Such machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc.

FIG. 8 illustrates an example process 800 for predicting whether a vehicle is going to enter a lane region in front of another vehicle, and controlling the other vehicle based on such a prediction, as described herein.

Block 802 illustrates receiving sensor data associated with an environment of a vehicle. As described above, individual vehicles, such as the vehicle 602, can include sensor component(s) 606. In at least one example, the sensor component(s) 606 can include lidar sensors, radar sensors, ultrasonic transducers, sonar sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, audio sensors, environment sensors (e.g., temperature sensors, humidity sensors, light sensors, pressure sensors, etc.), ToF sensors, etc. The sensor component(s) 606 can provide input to the vehicle computing device(s) 604.

Block 804 illustrates determining whether another vehicle is detected proximate to the vehicle. As described above, the vehicle 602 can include one or more components associated with the vehicle computing device(s) 604 onboard the vehicle 602. In at least one example, the localization component 620 can determine a pose (position and orientation)

of the vehicle 602 in relation to a local and/or global map based at least in part on sensor data received from the sensor component(s) 606 and/or map data associated with a map (e.g., of the map(s)). In at least one example, the localization component 620 can include, or be associated with, a calibration component that is capable of performing operations for calibrating (determining various intrinsic and extrinsic parameters associated with any one or more of the sensor component(s) 606), localizing, and mapping substantially simultaneously.

In at least one example, the perception component 622 can perform object detection, segmentation, and/or classification based at least in part on sensor data received from the sensor component(s) 606. In at least one example, the perception component 622 can receive raw sensor data (e.g., from the sensor component(s) 606). In at least one example, the perception component 622 can receive sensor data and can utilize one or more processing algorithms to perform object detection, segmentation, and/or classification with respect to object(s) identified in the sensor data. In some examples, the perception component 622 can associate a bounding region (or otherwise an instance segmentation) with an identified object and can associate a confidence score associated with a classification of the identified object with the identified object. In some examples, objects, when rendered via a display, can be colored based on their perceived class.

In at least one example, the prediction component 624 can analyze localization data (e.g., output from the localization component 620) and perception data (e.g., output from the perception component 622) to determine whether the perception data indicates that another vehicle is within a threshold distance of the vehicle 602. That is, the prediction component 624 can determine whether another vehicle is proximate the vehicle 602. If no vehicle is determined to be proximate the vehicle 602, the process 800 can return to block 802. If another vehicle is determined to be proximate the vehicle 602, the prediction component 624 can determine an output indicate whether the other vehicle is predicted to enter a lane in front of the vehicle 602, as described below.

Block 806 illustrates determining whether the other vehicle is predicted to perform a cut-in maneuver. In at least one example, the prediction component 624 can use the model, trained via machine learning techniques described above with reference to FIG. 7, to output a prediction indicating whether the other vehicle is going to enter the driving lane of the vehicle 602 in front of the vehicle 602, or otherwise perform a cut-in maneuver. That is, the prediction component 624 can use a model to generate a prediction regarding whether the other vehicle is likely to perform a cut-in maneuver (e.g., enter a driving lane in front of the vehicle 602).

In at least one example, the prediction component 624 can convert the sensor data (e.g., received in block 802) into a top-down representation of the environment. For example, the prediction component 624 can generate multi-channel image(s) associated with such sensor data. As described above, each channel can correspond to a feature which can include, but is not limited to, annotations in map(s) associated with the environment indicating parking spot(s) (e.g., substantially perpendicular parking spot(s)) or parking lot(s), alley(s), driveway(s), and the like), positions of the vehicle and/or the other vehicle (e.g., direction of travel, angular offset from another vehicle, etc.), an instantaneous velocity of the other vehicle, an indication of whether a driver is in the other vehicle, an indication of a direction that the driver is looking (e.g., head direction of the driver), an indication of whether a door associated with the other vehicle is open or closed, an indication of whether an engine of the other vehicle is in a running state or off state, a wheel angle associated with wheel(s) of the other vehicle, an indication of whether a brake light of the other vehicle is illuminated, an indication of whether a headlight of the other vehicle is illuminated, an indication of whether a reverse light of the other vehicle is illuminated, an indication of whether a blinker of the other vehicle is illuminated, or a lighting state associated with the other vehicle, etc. In at least one example, each channel can be associated with a top-down view of the environment. That is, a channel can represent sensor output or information based on a sensor output that is modeled in a top-down representation. As above, multiple multi-channel images representing a period of time preceding a most recent time step (or any other data structure) are contemplated.

In at least one example, the model can be trained to analyze one or more features (also referred to as attributes, characteristics, parameters, data, and the like) associated with the environment within which the sensor data is associated and/or the other vehicle to output a prediction with respect to whether the other vehicle is going to enter the driving lane of the vehicle 602 in front of the vehicle 602. In at least one example, the prediction component 624 can receive an output (e.g., from the respective model) that indicates a likelihood that the other vehicle is going to enter the driving lane of the vehicle 602 in front of the vehicle 602. As described above, in some examples, the output can be a binary indicator (e.g., "yes" or "no"), indicating whether the other vehicle is going to enter the driving lane of the vehicle 602 in front of the vehicle 602 or not. In some examples, the output can be a percentage or other metric indicating a certainty of whether the other vehicle is going to enter the driving lane of the vehicle 602 in front of the vehicle 602. In such examples, the prediction component 624 can compare the output percentage or other metric to a threshold and, if the output percentage or other metric is greater than or equal to the threshold, the prediction component 624 can determine that the other vehicle is predicted to enter into the driving lane of the vehicle 602 in front of the vehicle. If the output percentage or other metric is less than the threshold, the prediction component 624 can determine that the other vehicle is predicted to enter into the driving lane of the vehicle 602 in front of the vehicle In at least one example, if the other vehicle is predicted to enter into a lane in front of the vehicle 602 (e.g., perform a cut-in maneuver), the planning component 626 associated with the vehicle 602 can receive an indication of such. The planning component 626 can determine a first instruction for controlling the vehicle 602 in view of the other vehicle, as illustrated in block 808, and can cause the vehicle 602 to be controlled based at least in part on the first instruction, as illustrated in block 810. That is, as described above, the planning component 626 can utilize the output of the model to determine how to navigate the vehicle 602 in its environment. For example, the planning component 626 can generate one or more trajectories that can be used by other components associated with the vehicle 602 to adapt driving operations based on predictions output by the model. In some examples, such trajectory(s) can be modifications of previous trajectory(s). In some examples, such trajectory(s) can be new trajectory(s) based on the first instruction. In view of the foregoing, the planning component 626 can determine a trajectory to navigate the vehicle 602 to accommodate the other vehicle, for example, by causing the vehicle 602 to decelerate thereby increasing a follow distance between the vehicle 602 and another vehicle, causing the vehicle 602 to decelerate to yield to the other vehicle and/or stop, causing the vehicle 602 to perform a lane change, causing the vehicle 602 to safely maneuver around the other vehicle, and/or any other combination of maneuvers the vehicle 602 is capable of performing, etc.

In some examples, the output can be used by the prediction component 624 to predict how the other vehicle is likely to maneuver and the prediction component 624 can output a trajectory representative of such a prediction. In such examples, the predicted trajectory associated with the other vehicle can be provided to the planning component 626 for the planning component to determine the trajectory for navigating the vehicle 602.

In at least one example, if the other vehicle is not predicted to enter into a lane in front of the vehicle 602, the planning component 626 associated with the vehicle 602 can receive an indication of such. In such an example, the planning component 626 can determine a second instruction for controlling the vehicle 602, as illustrated in block 812, and can cause the vehicle 602 to be controlled based at least in part on the second instruction, as illustrated in block 814. In such an example, if the other vehicle is not predicted to enter into the lane in front of the vehicle 602, the planning component 626 can plan a trajectory that otherwise controls the vehicle 602 to travel within the environment (which may or may not take the other car into consideration). In some examples, such a trajectory can be the same trajectory as previously determined (e.g., prior to determining that the other vehicle is not predicted to perform a cut-in maneuver). In some examples, the trajectory can be a new trajectory based on the second instruction.

FIGS. 1-5, described above, illustrate various examples of other vehicles that are proximate to a vehicle, such as the vehicle 602, that are entering a lane region of the driving lane in front of the vehicle 602 or are otherwise performing a "cut-in maneuver," as described herein. Such examples include left turns, right turns, U-turns, three-point turns, and the like. As described above, additional or alternative examples are within the scope of this disclosure (e.g., K-turns, any N-point turn, etc.). That is, the process 800, described above, can be applicable to any example where another vehicle that is proximate to and associated with a same or different direction of travel than the vehicle 602 enters—or is predicted to enter—a lane region of the driving lane in front of the vehicle.

Example Clauses

A. A method comprising: receiving log data associated with vehicles in an environment; detecting an event in the log data, wherein an event corresponds to a cut-in maneuver performed by a vehicle; determining a period of time associated with the event; accessing a portion of the log data that corresponds to the period of time; generating training data based at least in part on converting the portion of the log data that corresponds to the period of time into a top-down representation of the environment; inputting the training data into a model; determining, by the model, an output comprising an indication that another vehicle is likely to perform another cut-in maneuver; determining a difference between the output and an expected output associated with the training data; altering one or more parameters of the model based on the difference; and transmitting the model to an autonomous vehicle configured to be controlled by another output of the model.

B. The method as paragraph A recites, wherein the log data comprises raw sensor data and a downstream output determined based at least in part on the raw sensor data, wherein the downstream output comprises perception data, prediction data, or planner data.

C. The method as paragraph A or B recites, further comprising: determining that a position of the vehicle changes from being substantially parallel to a centerline of a driving surface to within a designated offset of 90 degrees of the centerline; and determining a start of the period of time based at least in part on determining when the position of the vehicle changes from being substantially parallel to the centerline to within the designated offset of 90 degrees of the centerline.

D. The method as any of paragraphs A-C recites, further comprising: determining that a velocity of the vehicle changes from zero to a non-zero velocity prior to the event; and determining a start of the period of time based at least in part on determining when the velocity of the vehicle changes from zero to the non-zero velocity prior to the event.

E. A system comprising: one or more processors; and one or more non-transitory computer-readable media storing instructions, that when executed by the one or more processors, cause the system to perform operations comprising: receiving log data associated with vehicles in an environment; detecting an event in the log data, wherein an event corresponds to a cut-in maneuver performed by a vehicle; generating training data based at least in part on converting a portion of the log data that corresponds to the event into a top-down representation of the environment; inputting the training data into a model; and transmitting the model to an autonomous vehicle configured to be controlled by another output of the model.

F. The system as paragraph E recites, the operations further comprising: determining a period of time associated with the event; and accessing a portion of the log data that corresponds to the period of time; wherein the top-down representation of the environment is associated with the portion of the log data that corresponds to the period of time.

G. The system as paragraph F recites, the operations further comprising: determining that a position of the vehicle changes from being substantially parallel to a centerline of a driving surface to within a designated offset of 90 degrees of the centerline; and determining a start of the period of time based at least in part on determining when the position of the vehicle changes from being substantially parallel to the centerline to within the designated offset of 90 degrees of the centerline.

H. The system as paragraph F or G recites, the operations further comprising: determining that a velocity of the vehicle changes from zero to a non-zero velocity prior to the event; and determining a start of the period of time based at least in part on determining when the velocity of the vehicle changes from zero to the non-zero velocity prior to the event.

I. The system as any of paragraphs E-H recites, the operations further comprising: determining, by the model, an output comprising an indication that another vehicle is likely to perform another cut-in maneuver; determining a difference between the output and an expected output associated with the training data; and altering one or more parameters of the model based on the difference.

J. The system as any of paragraphs E-I recites, wherein the model comprises a convolutional neural network.

K. The system as any of paragraphs E-J recites, wherein the top-down representation comprises a multi-channel image, wherein each channel corresponds to at least one of: a position of the vehicle relative to a centerline of a driving surface; an instantaneous velocity of the vehicle; an indication of whether a driver is in the vehicle; an indication of whether a door associated with the vehicle is open or closed; an indication of whether an engine of the vehicle is in a running state or off state; an indication of whether a brake light of the vehicle is illuminated; an indication of whether a headlight of the vehicle is illuminated; an indication of whether a reverse light of the vehicle is illuminated; or an indication of whether a blinker of the vehicle is illuminated.

L. The system as any of paragraphs E-K recites, wherein the cut-in maneuver comprises any one of: a left turn from an alley, a parking spot, or a driveway; a right turn from an alley, a parking spot, or a driveway; a u-turn; an n-point turn; a k-turn; or a backward reverse into a driving lane.

M. One or more non-transitory computer-readable media storing instructions, that when executed by one or more processors, cause the one or more processors to perform operations comprising: receiving log data associated with vehicles in an environment; detecting an event in the log data, wherein an event corresponds to a cut-in maneuver performed by a vehicle; generating training data based at least in part on converting a portion of the log data that corresponds to the event into a top-down representation of the environment; and inputting the training data into a model, wherein the model is trained to output an indication of whether another vehicle is likely to perform another cut-in maneuver.

N. The one or more non-transitory computer-readable media as paragraph M recites, the operations further comprising transmitting the model to an autonomous vehicle configured to be controlled by another output of the model.

O. The one or more non-transitory computer-readable media as paragraph M or N recites, the operations further comprising: determining a period of time associated with the event; accessing a portion of the log data that corresponds to the period of time; wherein the top-down representation of the environment is associated with the portion of the log data that corresponds to the period of time.

P. The one or more non-transitory computer-readable media as paragraph O recites, wherein determining the period of time is based on at least one of a change in a position of the vehicle or a velocity of the vehicle.

Q. The one or more non-transitory computer-readable media as any of paragraphs M-P recites, the operations further comprising: determining a difference between an output of the model and an expected output associated with the training data; and altering one or more parameters of the model based on the difference.

R. The one or more non-transitory computer-readable media as any of paragraphs M-Q recites, wherein the model comprises a convolutional neural network.

S. The one or more non-transitory computer-readable media as any of paragraphs M-R recites, wherein the top-down representation comprises a multi-channel image, wherein each channel corresponds to at least one of: a position of the vehicle relative to a centerline of a driving surface; an instantaneous velocity of the vehicle; an indication of whether a driver is in the vehicle; an indication of whether a door associated with the vehicle is open or closed; an indication of whether an engine of the vehicle is in a running state or off state; an indication of whether a brake light of the vehicle is illuminated; an indication of whether a headlight of the vehicle is illuminated; an indication of whether a reverse light of the vehicle is illuminated; or an indication of whether a blinker of the vehicle is illuminated.

T. The one or more non-transitory computer-readable media as any of paragraphs M-S recites, wherein the cut-in maneuver comprises any one of: a left turn from an alley, a parking spot, or a driveway; a right turn from an alley, a parking spot, or a driveway; a u-turn; an n-point turn; a k-turn; or a backward reverse into a driving lane.

U. A method comprising: receiving sensor data associated with an environment of a first vehicle; detecting, based at least in part on the sensor data, a second vehicle proximate the first vehicle, wherein the second vehicle is substantially perpendicular to the first vehicle; determining, based at least in part on the sensor data, an attribute associated with the environment or the second vehicle that is indicative of whether the second vehicle is going to enter a lane region in front of the first vehicle; determining, based at least in part on the attribute, an indication whether the second vehicle will enter the lane region in front of the first vehicle; and determining an instruction for controlling the first vehicle based at least in part on the indication.

V. The method as paragraph U recites, wherein the second vehicle is substantially perpendicular to the first vehicle based at least in part on an angle between the second vehicle and the first vehicle being within a designated offset of 90 degrees.

W. The method as paragraph V recites, wherein the designated offset is 50 degrees.

X. The method as any of paragraphs U-W recites, wherein the second vehicle is positioned in a parking spot, driveway, or alley that is substantially perpendicular to the first vehicle.

Y. The method as any of paragraphs U-X recites, wherein the second vehicle is associated with a different direction of travel than the first vehicle.

Z. The method as any of paragraphs U-Y recites, wherein the attribute comprises at least one of: a position of the second vehicle relative to the first vehicle; an instantaneous velocity of the second vehicle; an indication of whether a driver is in the second vehicle; an indication of whether a door associated with the second vehicle is open or closed; an indication of whether an engine of the second vehicle is in a running state or off state; an indication of whether a brake light of the second vehicle is illuminated; an indication of whether a headlight of the second vehicle is illuminated; an indication of whether a reverse light of the second vehicle is illuminated; or an indication of whether a blinker of the second vehicle is illuminated.

AA. A system comprising: one or more processors; and one or more non-transitory computer-readable media storing instructions, that when executed by the one or more processors, cause the system to perform operations comprising: receiving sensor data associated with an environment of a first vehicle; determining, based at least in part on the sensor data, that a second vehicle proximate the first vehicle is predicted to enter a lane region in front of the first vehicle; and determining an instruction for controlling the first vehicle based at least in part on determining that the second vehicle proximate the first vehicle is predicted to enter the lane region in front of the first vehicle.

AB. The system as paragraph AA recites, further comprising determining that the second vehicle is predicted to enter the lane region in front of the first vehicle is based at least in part on determining one or more attributes associated with at least one of the second vehicle or the environment.

AC. The system as paragraph AB recites, wherein the one or more attributes comprise at least one of: a position of the second vehicle relative to the first vehicle; an instantaneous velocity of the second vehicle; an indication of whether a driver is in the second vehicle; an indication of whether a door associated with the second vehicle is open or closed; an indication of whether an engine of the second vehicle is in a running state or off state; an indication of whether a brake light of the second vehicle is illuminated; an indication of whether a headlight of the second vehicle is illuminated; an indication of whether a reverse light of the second vehicle is illuminated; or an indication of whether a blinker of the second vehicle is illuminated.

AD. The system as any of paragraphs AA-AC recites, wherein the first vehicle and the second vehicle are positioned at an angle between a designated offset from 90 degrees.

AE. The system as paragraph AD recites, wherein the second vehicle is positioned in a parking spot or a driveway on a same side of a road as the first vehicle or on an opposite side of a road as the first vehicle.

AF. The system as any of paragraphs AA-AE recites, wherein determining an instruction for controlling the first vehicle is based at least in part on an output from a machine-trained model, wherein the output comprises a binary indication whether the second vehicle will enter the lane region in front of the first vehicle or a percentage indicating a certainty associated with whether the second vehicle will enter the lane region in front of the first vehicle.

AG. The system as any of paragraphs AA-AF recites, wherein the instruction causes the first vehicle to at least one of decelerate, stop, or perform a lane change operation.

AH. One or more non-transitory computer-readable media storing instructions, that when executed by one or more processors, cause the one or more processors to perform operations comprising: receiving sensor data associated with an environment of a first vehicle; converting the sensor data into a top-down representation of the environment; inputting the top-down representation into a machine-trained model; determining, based at least in part on inputting the top-down representation into the machine-trained model, that a second vehicle proximate the first vehicle is predicted to enter a lane region in front of the first vehicle; and determining an instruction for controlling the first vehicle based at least in part on determining that the second vehicle proximate the first vehicle is predicted to enter the lane region in front of the first vehicle.

AI. The one or more non-transitory computer-readable media as paragraph AH recites, wherein determining that the second vehicle proximate the first vehicle is predicted to enter the lane region in front of the first vehicle is based at least in part on at least one attribute, wherein the attribute comprises: an instantaneous velocity of the second vehicle; an indication of whether a driver is in the second vehicle and, if the driver is in the second vehicle, an indication of a head direction of the driver; an indication of whether an engine of the second vehicle is in a running state or an off state; a wheel angle associated with a wheel of the second vehicle; or an indication of whether at least one of a brake light, a headlight, a reverse light, or a blinker of the second vehicle is illuminated.

AJ. The one or more non-transitory computer-readable media as paragraph AH or AI recites, wherein the second vehicle is associated with a different direction of travel than the first vehicle.

AK. The one or more non-transitory computer-readable media as any of paragraphs AH-AJ recites, wherein the second vehicle and the first vehicle are positioned at an angle within a designated offset of 90 degrees.

AL. The one or more non-transitory computer-readable media as any of paragraphs AH-AK recites wherein the second vehicle is positioned in either (i) a parking spot or a driveway on a same side of a road as the first vehicle or (ii) a parking spot or a driveway on an opposite side of a road as the first vehicle.

AM. The one or more non-transitory computer-readable media as any of paragraphs AH-AL recites, the operations further comprising: inputting, into a prediction component, an indication that a second vehicle proximate the first vehicle is predicted to enter a lane region in front of the first vehicle; receiving, from the prediction component, a predicted trajectory associated with the second vehicle; and determining the instruction further based at least in part on the predicted trajectory.

AN. The one or more non-transitory computer-readable media as any of paragraphs AH-AM recites, wherein the instruction causes the first vehicle to at least one of decelerate or perform a lane change operation.

While the example clauses described above are described with respect to one particular implementation, it should be understood that, in the context of this document, the content of the example clauses can also be implemented via a method, device, system, a computer-readable medium, and/or another implementation. Additionally, any of examples A-AN may be implemented alone or in combination with any other one or more of the examples A-AN.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
  receiving sensor data associated with an environment of a first vehicle operating within a structured region of map data;
  detecting, by the first vehicle and based at least in part on the sensor data, a second vehicle proximate the first vehicle, wherein the second vehicle is in an unstructured region of the map data and is positioned between a first angle and a second angle relative to the first vehicle, the unstructured region including unstructured portions of the map data representing a portion of the environment other than a roadway;
  determining, by the first vehicle and based at least in part on the sensor data, an attribute associated with the second vehicle that is indicative of whether the second vehicle that begins from the unstructured region is going to enter a lane region associated with the first vehicle in the structured region of the map data;

determining, based at least in part on the attribute and the second vehicle being in the unstructured region, an indication of whether the second vehicle will enter the lane region associated with the first vehicle, wherein determining the indication is performed, at least in part, by a machine learned model trained to predict behavior of objects in environments including that objects in unstructured portions of the map data, including the unstructured region, are less likely to follow rules of the road;

determining, by the machine learned model, a confidence score associated with the indication;

determining an instruction for controlling the first vehicle based at least in part on the indication and the confidence score; and controlling the first vehicle based at least in part on the instruction.

2. The method of claim 1, wherein the second vehicle is positioned in at least one of a parking spot, driveway, or alley that is substantially perpendicular to the first vehicle.

3. The method of claim 1, wherein the machine learned model is trained to predict the behavior of objects based on sensor data and unstructured portions of map data.

4. The method of claim 1, wherein the attribute comprises at least one of:
 a position of the second vehicle relative to the first vehicle;
 an instantaneous velocity of the second vehicle;
 an indication of whether a driver is in the second vehicle;
 an indication of whether a door associated with the second vehicle is open or closed;
 an indication of whether an engine of the second vehicle is in a running state or off state;
 an indication of whether a brake light of the second vehicle is illuminated;
 an indication of whether a headlight of the second vehicle is illuminated;
 an indication of whether a reverse light of the second vehicle is illuminated; or
 an indication of whether a blinker of the second vehicle is illuminated.

5. The method of claim 1, wherein the unstructured region represents at least one of a driveway, parking lot, or region in which there are no lane markers.

6. The method of claim 1, wherein the second vehicle transitions from an unstructured portion of map data to a structured portion of map data.

7. The method of claim 1, wherein the machine learned model is trained using multi-channel images, wherein a respective channel of the multi-channel images includes map data.

8. A system comprising:
 one or more processors; and
 one or more non-transitory computer-readable media storing instructions, that when executed by the one or more processors, cause the system to perform operations comprising:
  receiving sensor data associated with an environment of a first vehicle operating within a structured region of map data;
  determining, by the first vehicle, an indication that a second vehicle proximate to the first vehicle is predicted to enter a lane region in front of the first vehicle and within the structured region of the map data, wherein the second vehicle is in an unstructured region and is positioned between a first angle and a second angle relative to the first vehicle, the unstructured region including unstructured portions of the map data, wherein determining the indication that the second vehicle that begins from the unstructured region will enter the lane region in front of the first vehicle is based at least in part on the second vehicle being in the unstructured region and is performed, at least in part, by a machine learned model trained to predict behavior of objects in an environment including that objects in unstructured portions of the map data, including the unstructured region, are less likely to follow rules of the road;
  determining, by the machine learned model, a confidence score associated with the indication;
  determining an instruction for controlling the first vehicle based at least in part on determining that the second vehicle proximate the first vehicle is predicted to enter the lane region in front of the first vehicle and on the confidence score; and
  controlling the first vehicle, based at least in part on the instruction.

9. The system of claim 8, further comprising determining that the second vehicle is predicted to enter the lane region in front of the first vehicle is based at least in part on determining one or more attributes associated with at least one of the second vehicle or the environment.

10. The system of claim 9, wherein the one or more attributes comprise at least one of:
 a position of the second vehicle relative to the first vehicle;
 an instantaneous velocity of the second vehicle;
 an indication of whether a driver is in the second vehicle;
 an indication of whether a door associated with the second vehicle is open or closed;
 an indication of whether an engine of the second vehicle is in a running state or off state;
 an indication of whether a brake light of the second vehicle is illuminated;
 an indication of whether a headlight of the second vehicle is illuminated;
 an indication of whether a reverse light of the second vehicle is illuminated; or
 an indication of whether a blinker of the second vehicle is illuminated.

11. The system of claim 8, wherein the second vehicle is positioned in a parking spot or a driveway on a same side of a road as the first vehicle or on an opposite side of a road as the first vehicle.

12. The system of claim 8, wherein the instruction causes the first vehicle to at least one of decelerate, stop, or perform a lane change operation.

13. The system of claim 8, the operations further comprising:
 converting the sensor data into a top-down representation of the environment; and
 inputting the top-down representation into a machine-trained model.

14. One or more non-transitory computer-readable media storing instructions, that when executed by one or more processors, cause the one or more processors to perform operations comprising:
 receiving sensor data associated with an environment of a first vehicle operating within a structured region of map data;
 converting the sensor data into a top-down representation of the environment;
 inputting the top-down representation into a machine-trained model;

determining, based at least in part on inputting the top-down representation into the machine-trained model, an indication that a second vehicle in an unstructured region and proximate to the first vehicle is predicted to enter a lane region in the structured region of the map data in front of the first vehicle, the unstructured region including unstructured portions of the map data, wherein determining that the second vehicle that begins from the unstructured region is predicted to enter the lane region in the structured region of the map data in front of the first vehicle from the unstructured region is based at least in part on the second vehicle being in the unstructured region and is performed, at least in part, by a machine learned model trained to predict behavior of objects in the environment from the sensor data and the map data including that objects in unstructured portions of the map data, including the unstructured region, are less likely to follow rules of the road;

determining, by the machine learned model, a confidence score associated with the indication; and determining an instruction for controlling the first vehicle based at least in part on determining that the second vehicle proximate the first vehicle is predicted to enter the lane region in front of the first vehicle and on the confidence score.

15. The one or more non-transitory computer-readable media of claim 14, wherein determining that the second vehicle proximate the first vehicle is predicted to enter the lane region in front of the first vehicle is based at least in part on an attribute, wherein the attribute comprises:

an indication of whether a driver is in the second vehicle and, if the driver is in the second vehicle, an indication of a head direction of the driver;

an indication of whether an engine of the second vehicle is in a running state or an off state;

a wheel angle associated with a wheel of the second vehicle; or an indication of whether at least one of a brake light, a headlight, a reverse light, or a blinker of the second vehicle is illuminated.

16. The one or more non-transitory computer-readable media of claim 14, wherein the second vehicle is associated with a different direction of travel than the first vehicle.

17. The one or more non-transitory computer-readable media of claim 14, wherein the second vehicle and the first vehicle are positioned at an angle of between 40 degrees and 140 degrees.

18. The one or more non-transitory computer-readable media of claim 14, wherein the second vehicle is positioned in either (i) a parking spot or a driveway on a same side of a road as the first vehicle or (ii) a parking spot or a driveway on an opposite side of a road as the first vehicle.

19. The one or more non-transitory computer-readable media of claim 14, the operations further comprising:

inputting, into a prediction component, the indication that the second vehicle in an unstructured region and proximate the first vehicle is predicted to enter the lane region in front of the first vehicle;

receiving, from the prediction component, a predicted trajectory associated with the second vehicle; and determining the instruction further based at least in part on the predicted trajectory.

20. The system of claim 8, wherein the confidence score represents a certainty associated with whether the second vehicle will enter the lane region in front of the first vehicle.

* * * * *